United States Patent
Kratz et al.

(10) Patent No.: US 10,377,486 B2
(45) Date of Patent: Aug. 13, 2019

(54) DRONE DEPLOYED SPEAKER SYSTEM

(71) Applicant: Harman International Industries, Incorporated, Stamford, CT (US)

(72) Inventors: Sven Kratz, San Jose, CA (US); Joseph Verbeke, San Francisco, CA (US); Stefan Marti, Oakland, CA (US); Adam Boulanger, Palo Alto, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/834,957

(22) Filed: Dec. 7, 2017

(65) Prior Publication Data

US 2019/0176982 A1    Jun. 13, 2019

(51) Int. Cl.
*B64C 39/02* (2006.01)
*H04R 3/12* (2006.01)
*H04R 5/02* (2006.01)

(52) U.S. Cl.
CPC ............. *B64C 39/024* (2013.01); *H04R 3/12* (2013.01); *H04R 5/02* (2013.01); *B64C 2201/12* (2013.01)

(58) Field of Classification Search
CPC .......... H04R 5/02; H04R 3/12; B64C 39/024; B64C 2201/12
USPC ........................................................ 381/302
See application file for complete search history.

(56) References Cited

U.S. PATENT DOCUMENTS

| 5,185,801 A | 2/1993 | Meyer et al. |
| 2002/0060267 A1 | 5/2002 | Yavnai |
| 2005/0271221 A1 | 12/2005 | Cerwin |
| 2007/0200027 A1 | 8/2007 | Johnson |
| 2008/0212819 A1 | 9/2008 | Cerwin et al. |
| 2010/0201807 A1 | 8/2010 | McPherson |

(Continued)

FOREIGN PATENT DOCUMENTS

| JP | 2017-069804 A | 4/2017 | |
| WO | 2013150374 A1 | 10/2013 | |
| WO | 2014032709 A1 | 3/2014 | |
| WO | WO-2014032709 A1 * | 3/2014 | ............ H04S 7/301 |
| WO | 2016029469 A1 | 3/2016 | |

OTHER PUBLICATIONS

Sojeong et al., "Advanced Sound Capturing Method with Adaptive Noise Reduction System for Broadcasting Multicopters", 2015 IEEE International Conference on Consumer Electronics (ICCE), Jan. 9-12, 2015, pp. 26-29.

(Continued)

*Primary Examiner* — Paul Kim

(74) *Attorney, Agent, or Firm* — Artegis Law Group, LLP

(57) ABSTRACT

A drone speaker system is configured to deploy a fleet of drone speaker units. Each drone speaker unit includes a speaker configured to broadcast acoustic signals and a flight system configured to aerially transport a speaker. The drone speaker system initially generates a spatial map of a location where the drone speaker units are to be deployed. The drone speaker system then identifies suitable perching locations for the drone speaker units. Then, the drone speaker system deploys the fleet of drone speaker units to those perching locations to place one or more speakers. Once positioned in this manner, the speakers can generate a sound field. The drone speaker units may also reconfigure the speakers to achieve different sound fields having varying characteristics.

20 Claims, 32 Drawing Sheets

(56) References Cited

U.S. PATENT DOCUMENTS

| | | |
|---|---|---|
| 2013/0050652 A1 | 2/2013 | Wharton |
| 2013/0166103 A1 | 6/2013 | Ko |
| 2014/0211086 A1 | 7/2014 | Wharton et al. |
| 2016/0375997 A1 | 12/2016 | Welsh et al. |

OTHER PUBLICATIONS

Extended European Search Report for EP Application No. 16167374.4, dated Aug. 5, 2016, 7 pages.
Hovding—Airbag for urban cyclists: How it works, 11 pages, http://www.hovding.com/how_hoyding_works//?p=en/how_it_works.
Warwick Mills "Protective Fabric Warwick's Material Used in Mars Landings" http://www.warwickmills.com/Protective-Fabrics-Mars.aspx.
QuadcopterHQ.com, Admin "What is a Gimbal" Dec. 2, 2013 (5 pages). http://www.warwickmills.com/Protective-Fabrics-Mars.aspx.
Woodward, Curt "Xconomist of the Week: Helen Greiner's CyPhy Works Unveils Drones" Xconomy, Inc. Dec. 3, 2012 (3 pages) http://www.warwickmills.com/Protective-Fabrics-Mars.aspx.
Grizzly Analytics home page—http://www.grizzlyanalytics.com/home.html.
Extended European Search Report for EP Application No. 18209952.3, dated Apr. 5, 2019.
Chawla, Sumit, "Cara Cad and Cara Caic Room Acoustic Software", Secrets of Home Theater & High Fidelity, https://hometheaterhifi.com/volume_9_4/cara-software-10-2002.html, Oct. 1, 2002, 11 pages.

* cited by examiner

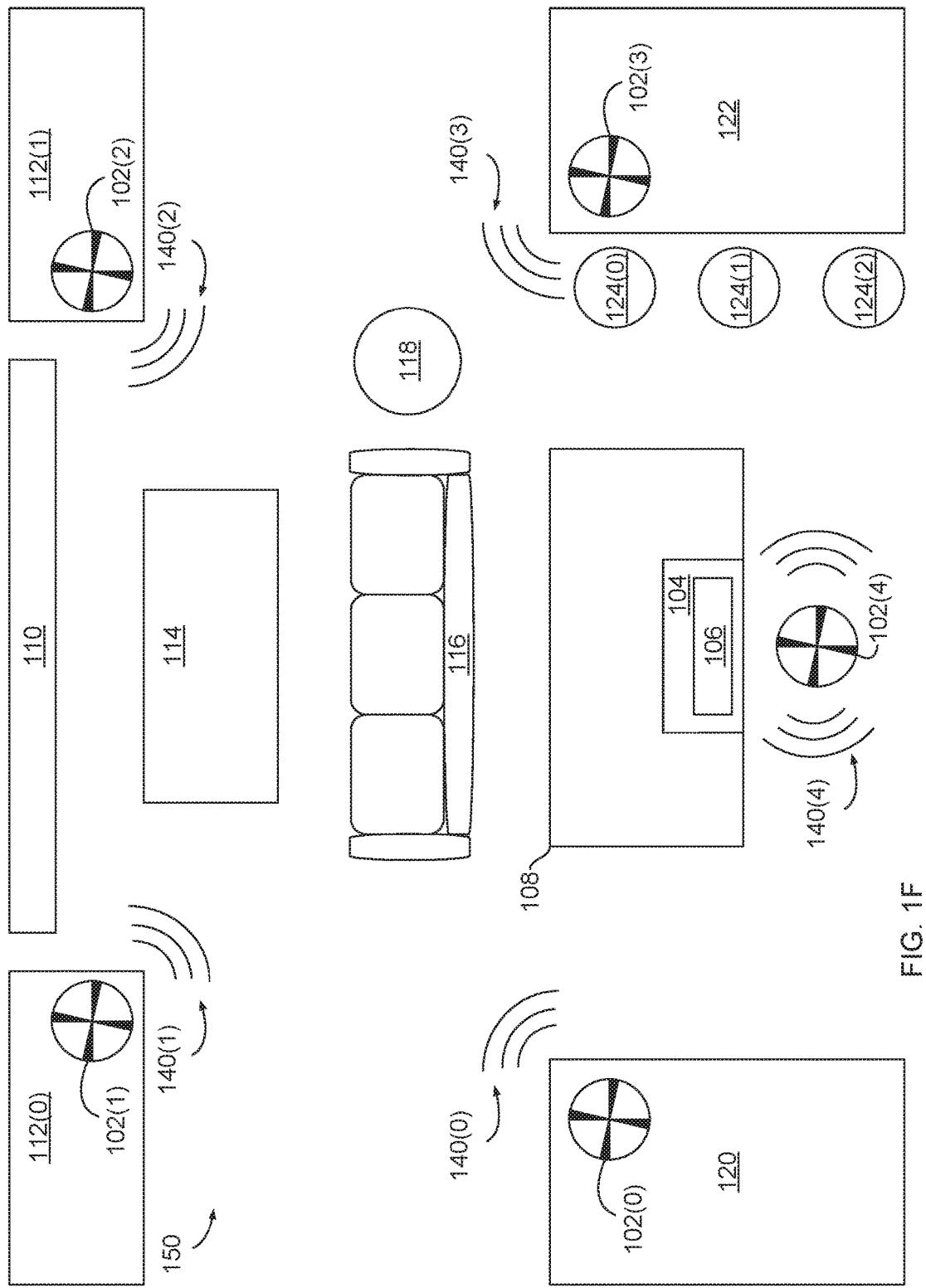

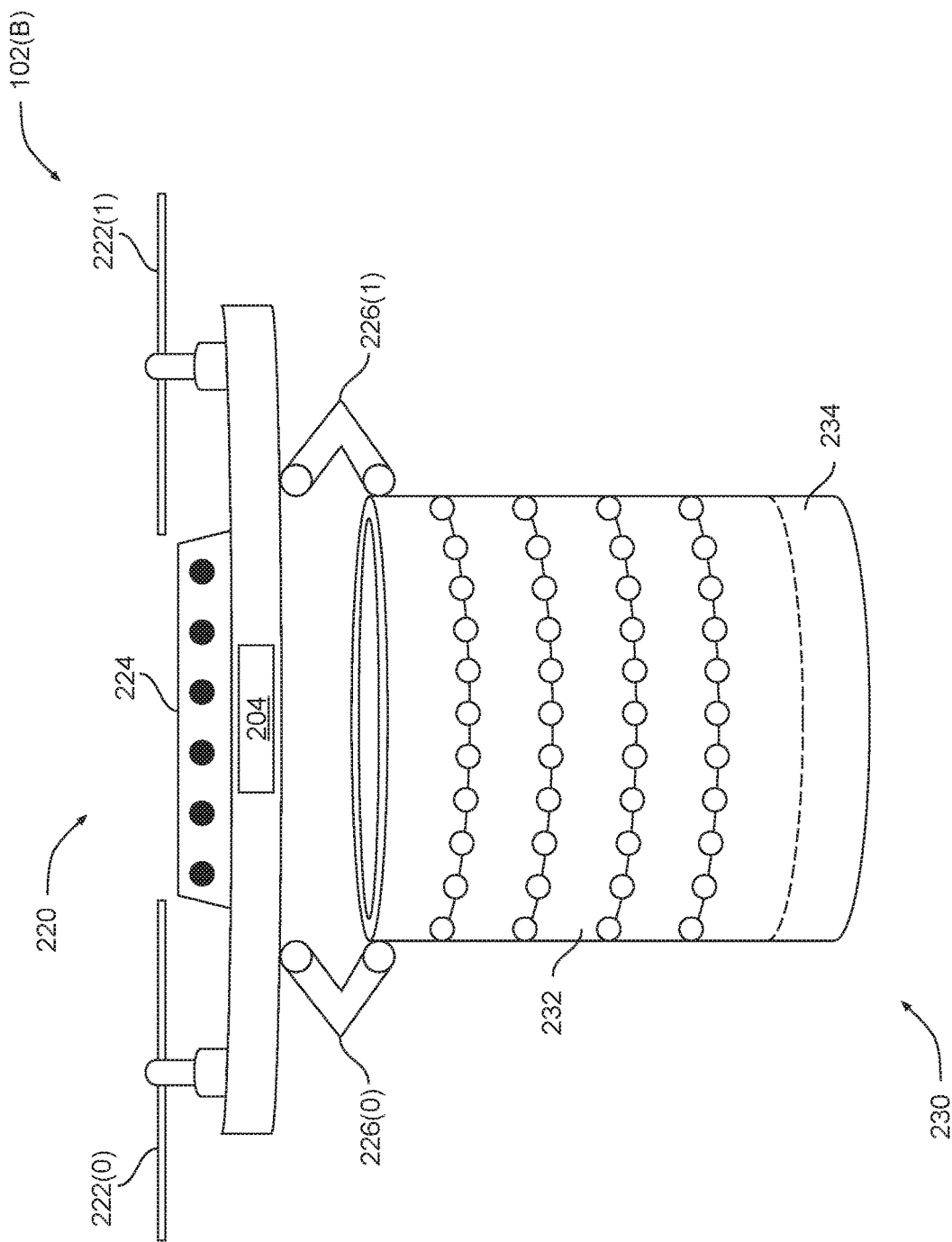

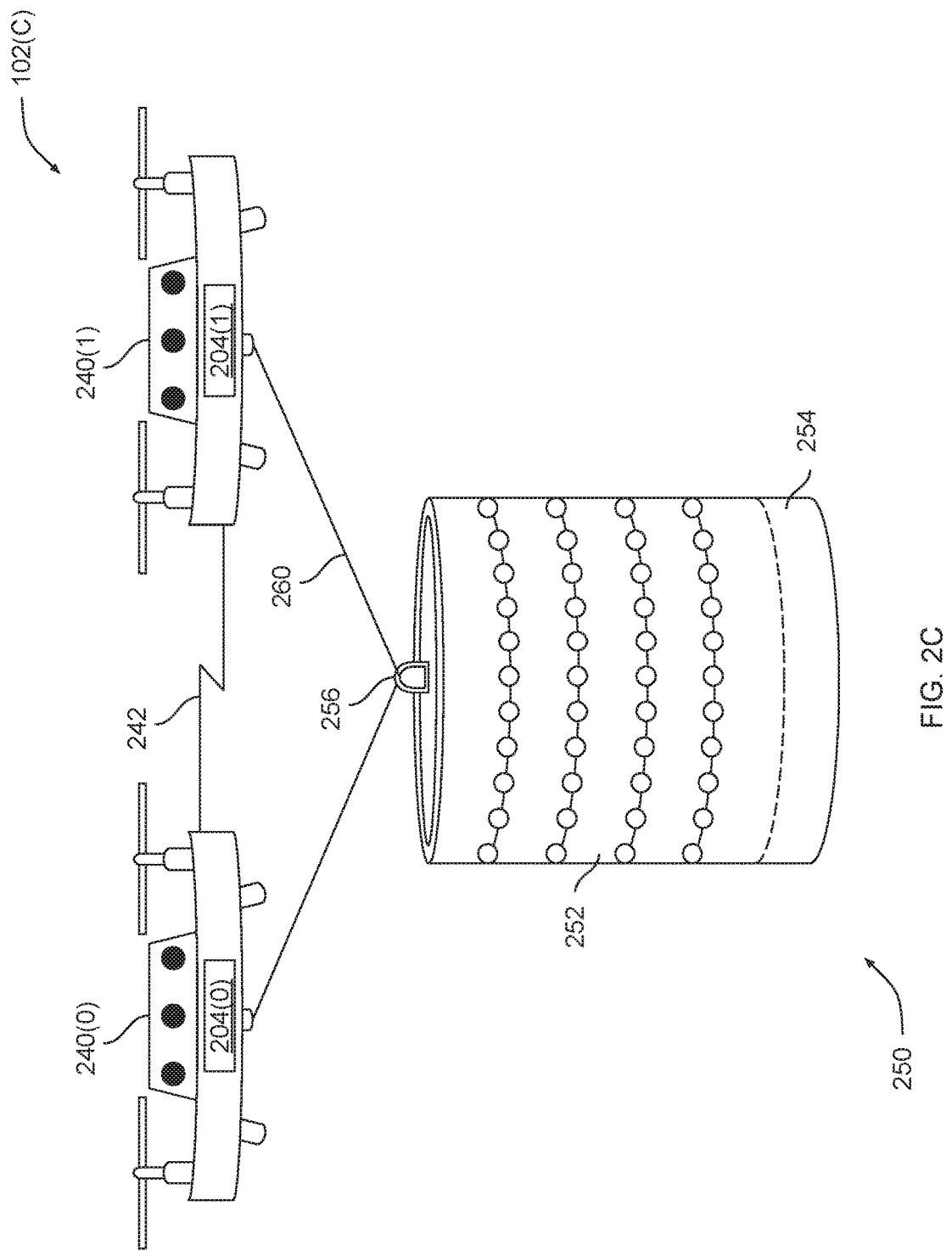

PERCHING CRITERIA 342

OBSTRUCTION CHARACTERISTICS 342(0)

GEOMETRY CHARACTERISTICS 342(1)

TEXTURE CHARACTERISTICS 342(2)

STABILITY CHARACTERISTICS 342(3)

AVAILABILITY CHARACTERISTICS 342(4)

MOUNTING CHARACTERISTICS 342(5)

PLACEMENT CRITERIA 352

SOUND FIELD CHARACTERISTICS 352(0)

HOTSPOT CHARACTERISTICS 352(1)

POSITIONING CHARACTERISTICS 352(2)

FIG. 3C

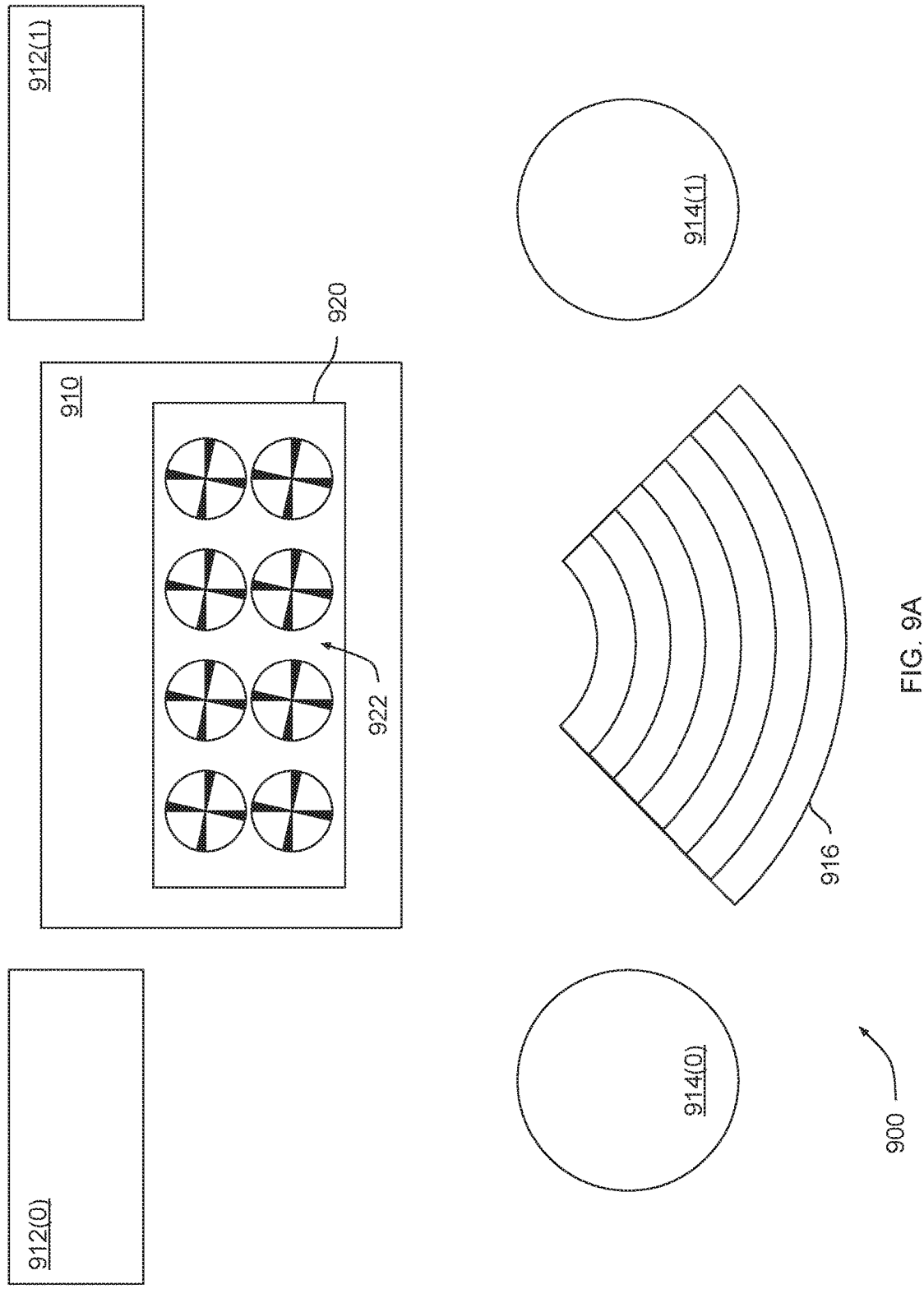

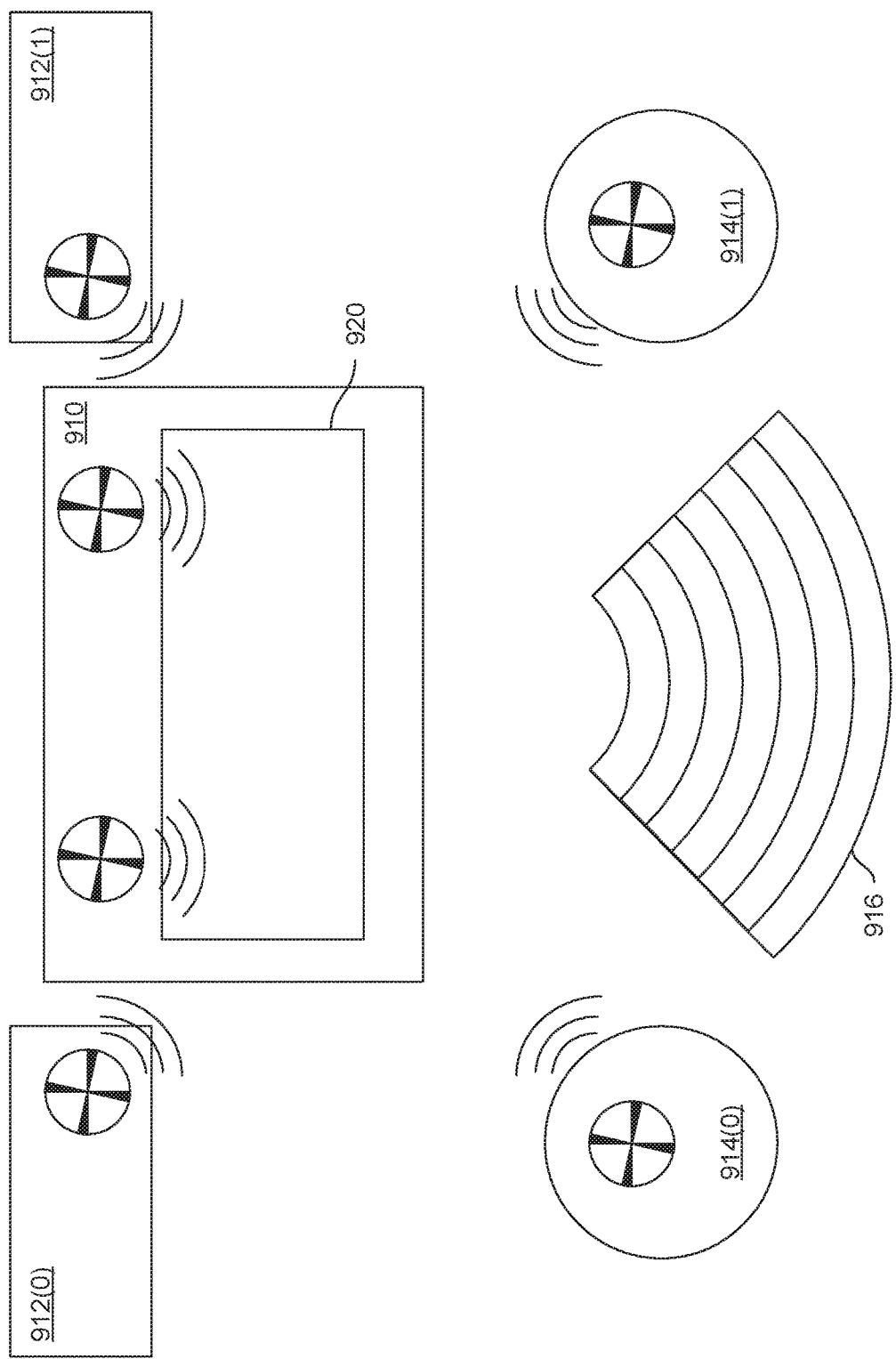

DRONE DEPLOYED SPEAKER SYSTEM

BACKGROUND

Field of the Disclosed Embodiments

The disclosed embodiments relate generally to speaker systems and, more specifically, to a drone deployed speaker system.

Description of the Related Art

Setting up a conventional sound system in a listening environment may be a slow process. During set-up, speakers are manually placed in the listening environment. During operation of the conventional sound system, the speakers generate a sound field in the listening environment. The sound field may include one or more "hotspots." A hotspot generally corresponds to a seating position for a listener in the listening environment. In the sound field, the hotspots are generally tuned to yield desirable sound quality. Therefore, a listener sitting in a hotspot may hear the best sound quality that the conventional sound system in the listening environment can offer.

In general, the sound field of the conventional sound system is highly dependent on the positioning and orientation of the speakers. As such, the one or more hotspots are often highly dependent on the positioning and orientation of the speakers. In the listening environment, the speakers are manually positioned and oriented. A listener may use iterative, manual adjustments to determine if one positioning and orientation sounds better than another. Alternatively, the listener may conduct various testing, use various tuning equipment, and/or perform various calculations to determine possible desirable positioning and orientations of the speakers. Once those possible desirable positioning and orientations are determined, the listener may manually adjust the positioning and orientation of each speaker accordingly. Determining, positioning, and orienting may therefore be a slow process.

Moreover, after positioning and reorienting, care should be taken to avoid unintentionally impacting the sound field. As mentioned, the sound field is generally highly dependent on the positioning and orientation of the speakers, as are the one or more hotspots. As such, even a slight change in positioning and/or orientation to one of the speakers may impact the sound field and the one or more hotspots. Such change may be brought about by bumping into one of the speakers, which results in a change to position and/or orientation.

At times, though, it may be desirable to impact the sound field to account for changes to the listening environment. For example, as seating positions are changes, such as by moving, removing, or adding furniture to the listening environment, it may be desirable to update the hotspots accordingly. Additionally, as other objects are moved, removed, or added to the listening environment, it may be desirable to impact the sound field by changing the positioning and/or orientation of one or more of the speakers. For example, a piece of furniture that is added to the listening environment and obstructingly placed in front of a speaker may make it desirable for the speaker to be repositioned and/or reoriented. The obstruction may negatively impact the sound field and one or more hotspots, so to overcome that, one or more of the speakers may be manually repositioned and/or reoriented.

As the foregoing illustrates, more efficient and versatile techniques for setting up a sound system would be useful.

SUMMARY

One or more embodiments set forth a method for configuring a speaker system, including generating a first spatial map of a first listening environment, determining a first set of perch locations within the first listening environment based on the first spatial map, deploying a fleet of drone speaker units to the first set of perch locations to populate the first listening environment with one or more speakers, and causing the one or more speakers to output sound from the first set of perch locations to generate a first sound field within the first listening environment.

At least one advantage of the disclosed embodiments is that the drone speaker system automatically determines placement for the speakers and also positions the speakers according to that placement, thereby lifting the burden of doing so from users. Accordingly, users may setup a sound system via the drone speaker system with relative ease.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the disclosed embodiments subsumes other embodiments as well.

FIGS. 1A-1F illustrate a drone speaker system configured to implement one or more aspects of the present invention;

FIGS. 2A-2C are more detailed illustrations of the drone speaker units of FIGS. 1A-1F, according to various embodiments;

FIGS. 3A-3C illustrate in greater detail the control application of FIGS. 1A-1F, according to various embodiments;

FIGS. 9A-9C illustrate how the drone speaker system of FIGS. 1A-1F deploys a fleet of drone speaker units to configure a concert venue, according to various embodiments;

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

As discussed above, setting up a conventional sound system may be a slow process. The conventional sound system typically includes one or speakers that need to be manually positioned and oriented in a listening environment. Beyond the manual aspect, determining where to position and how to orient each speaker may also be a slow process. The manual positioning and orienting, as well as the determining step, may require significant human involvement. Once determined and manually positioned and oriented, care should be taken to avoid unintentionally impacting a sound field of the conventional sound system. This is because the sound field is highly dependent on the positioning and orientation of the one or more speakers. Therefore, even slight changes to the positioning and/or orientation of even one of the speakers may impact the sound field. That being said, at times, there may be a desire to adjust the sound field to account for changes in the listening environment. This may require determining where to reposition and/or how to reorient, as well as the manual step of actually repositioning and/or reoriented.

To address this, embodiments of the invention include a drone speaker system configured to deploy a fleet of drone speaker units. Each drone speaker unit includes a speaker configured to broadcast acoustic signals and a flight system configured to aerially transport the speaker. The speaker and the flight system may be integrated or capable of being decoupled. The drone speaker system initially generates a spatial map of a location where the drone speaker units are to be deployed. The drone speaker system then identifies suitable perching locations for the drone speaker units or the speakers themselves. Then, the drone speaker system deploys the fleet of drone speaker units to those perching locations to position the speakers. Once positioned in this manner, the speakers can generate a sound field.

An advantage of this approach is that the drone speaker system automatically determines speaker placement and also positions the speakers according to that placement, thereby lifting the burden of doing so from users (e.g., end-users of a sound system, technicians, sound engineers, etc.).

System Overview

Figure 1A:
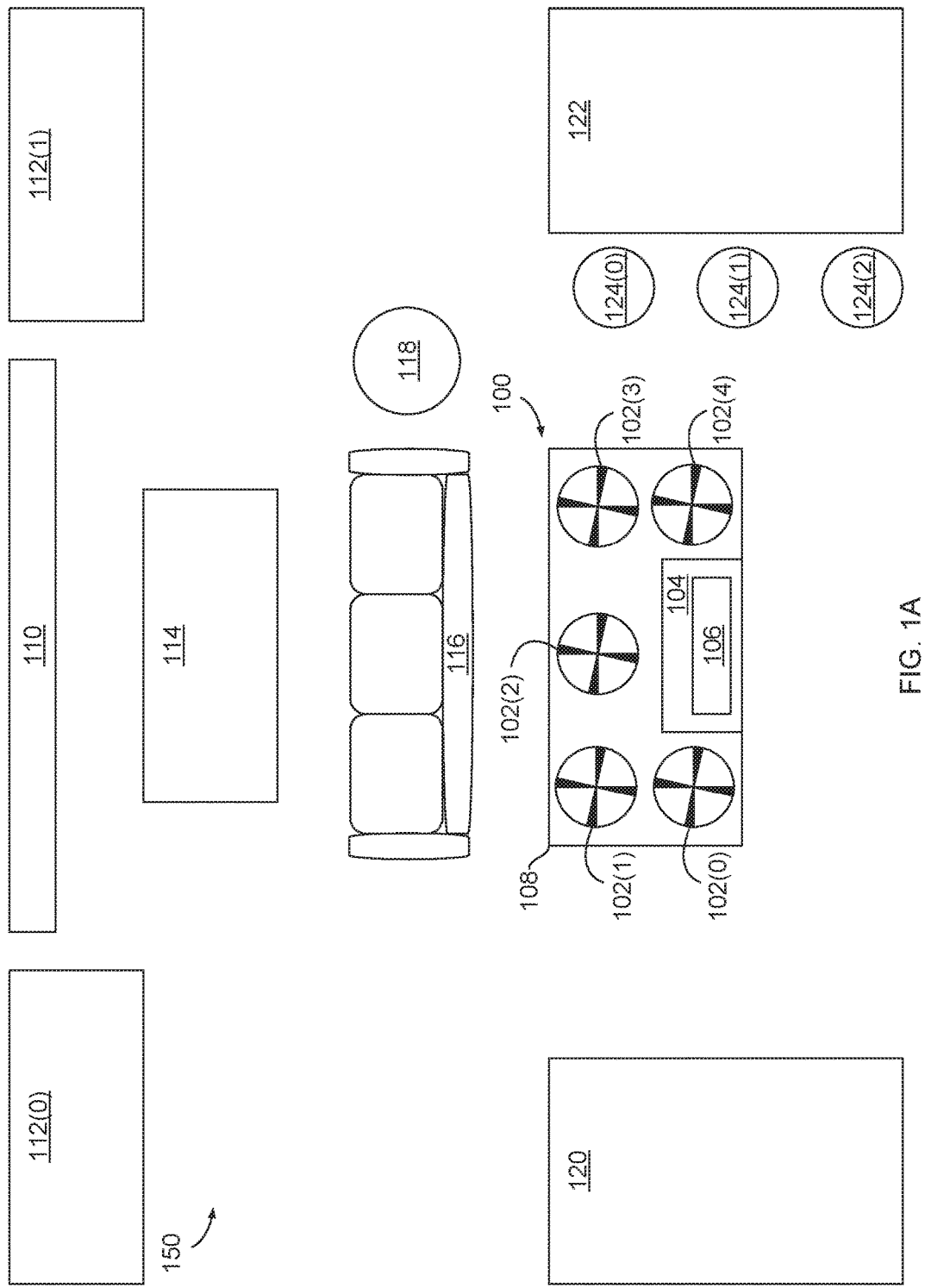

FIGS. 1A-1F illustrate a drone speaker system configured to implement one or more aspects of the present invention. As shown in FIG. 1A, drone speaker system 100 resides in an exemplary residential space 150 that includes various furniture, appliances, and other fixtures, such as a flat screen television (TV) 110, a set of shelves 112, a coffee table 114, a sofa 116, a side table 118, a dining table 120 and a bar area 122 accompanied by stools 124. Drone speaker system 100 includes a plurality of drone speaker units (DSUs) 102 and a hub computing device 104 that executes a control application 106. Hub computing device 104 resides within a hub 108 that is configured to store DSUs 102.

A given DSU 102 generally includes at least one speaker component and at least one aerial drone component. The speaker component of a DSU 102 is an audio device capable of receiving audio data streamed from computing device 104 and, based on that audio data, producing acoustic signals. For example, and without limitation, computing device 104 could stream a Motion Picture Experts Group layer-3 (MP3) audio file to a DSU 102, and the speaker component of the DSU 102 would then play music based on that MP3.

The aerial drone component of a DSU 102 includes mechanical and electrical components capable of generating sufficient lift to carry the speaker component through space from one location to another. For example, and without limitation, a given DSU 102 could include a cylindrical speaker component with a set of rotor blades affixed at the top of the speaker component. When rotating, the set of rotor blades would carry the DSU 102 between locations. This particular example is described in greater detail below in conjunction with FIG. 2A. Other exemplary DSUs 102 include separable drone components and speaker components, as described in greater detail below in conjunction with FIGS. 2B-2C. In the context of this disclosure, the terms "drone" and "drone component" may refer to any of the following: an unmanned aerial system (UAS), an unmanned aerial vehicle (UAV), an aerial robotic platform, a hovering platform, a quadcopter, a quadrotor, a coaxial rotor platform, and any other technically feasible device capable of flying while carrying a payload.

Control application 106 executing within hub computing device 104 generally coordinates the operation of each DSU 102. However, in some embodiments, control application 106 may be a distributed software entity that includes separate instances of control application 106 executing within each DSU 102, as discussed in greater detail below in conjunction with FIG. 3A.

Control application 106 is a software application, that, when executed, performs a multistep procedure for positioning DSUs 102 within residential space 150 or any other three-dimensional (3D) space and deploying speakers associated with those DSUs 102. Once positioned in this manner, the speakers produce acoustic signals that collectively generate a sound field within residential space 150. FIGS. 2B-2F illustrate examples of how each step of this procedure can be performed.

Figure 1B:
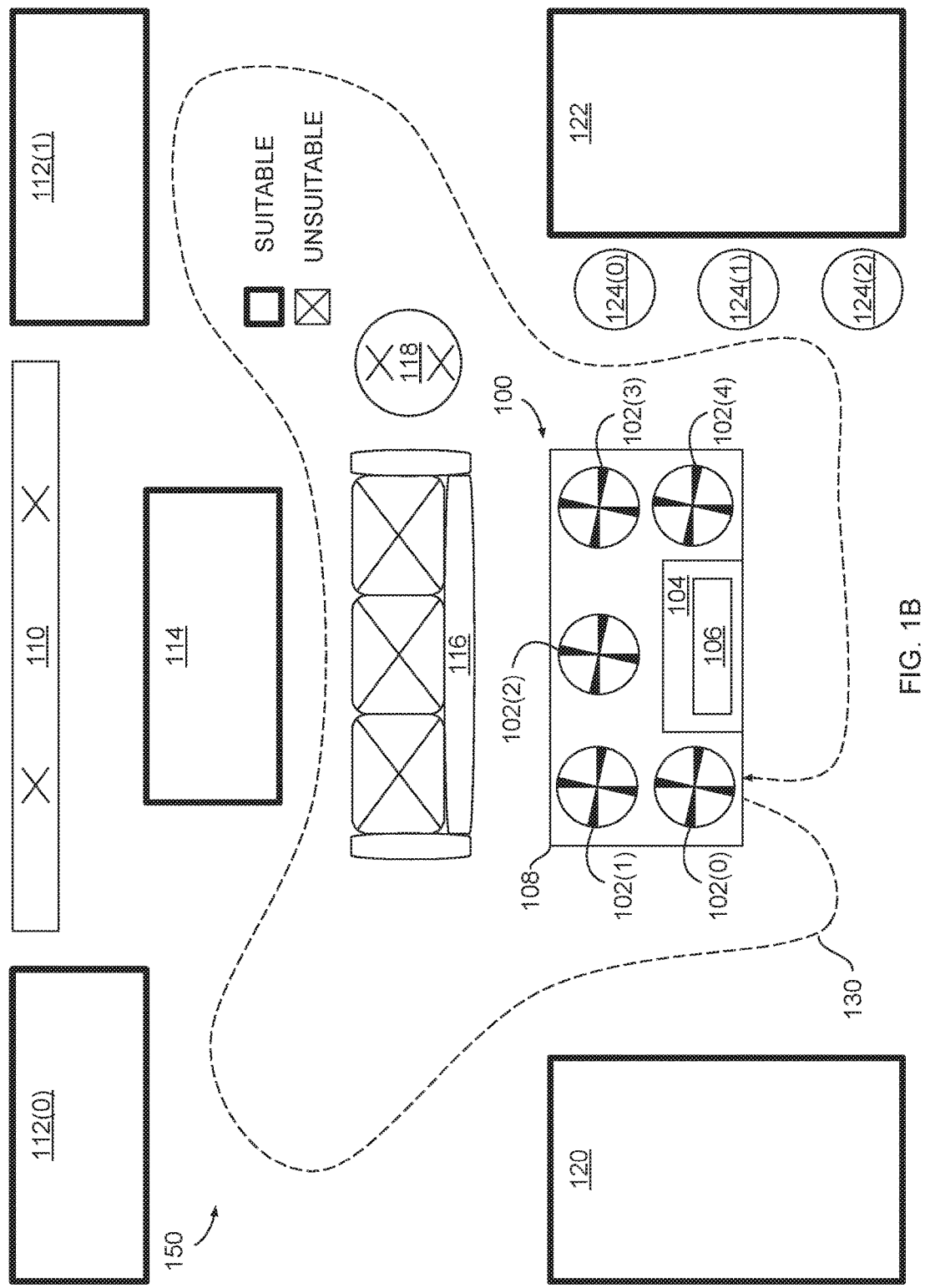

Referring now to FIG. 1B, control application 106 initially performs a mapping procedure to generate a spatial map of residential space 150. Control application 106 may implement a variety of different techniques to generate the spatial map. However, in the example shown here, control application 106 deploys a single DSU 102 to execute an exploratory flight along a trajectory 130. During flight, DSU 102 gathers sensor data that reflects the geometry of residential space 150. For example, and without limitation, DSU 102 could perform a light detection and ranging (LIDAR) sweep when traversing trajectory 130 to generate a 3D point cloud representing residential space 150. The spatial map may also include a triangulated mesh representing residential space 150. In one embodiment, the spatial map generated via the mapping procedure also includes various acoustic properties of residential space 150, including absorptive properties of surfaces within residential space 150, resonant frequencies of those surfaces, and so forth.

Control application 106 then analyzes the spatial map to identify various surfaces within residential space 150 that are suitable for placement of one or more DSUs 102 or speakers carried by DSUs 102. During this analysis, control application 106 may also identify surfaces that are unsuitable for DSU placement. Control application 106 may implement a multitude of criteria to identify surfaces suitable and/or unsuitable for DSU placement, as discussed in greater detail below in conjunction with FIGS. 3B-3C. However, in the example shown in FIG. 1B, control application 106 simply identifies surfaces that are substantially flat, solid, and include an obstruction-free area that accommodates at least one DSU 102. Here, control application 106 identifies that shelves 112, dining table 120, and bar area 122 meet the above criteria of flatness, solidness, clearance, and area, and are therefore suitable for DSU placement. Control application 106 also identifies that flat screen TV 110, sofa 116, and side table 118 do not meet these criteria and are therefore unsuitable for DSU placement. Again, the criteria implemented by control application 106 for determining surface suitability are discussed in greater detail below in conjunction with FIGS. 3B-3C.

Figure 1C:
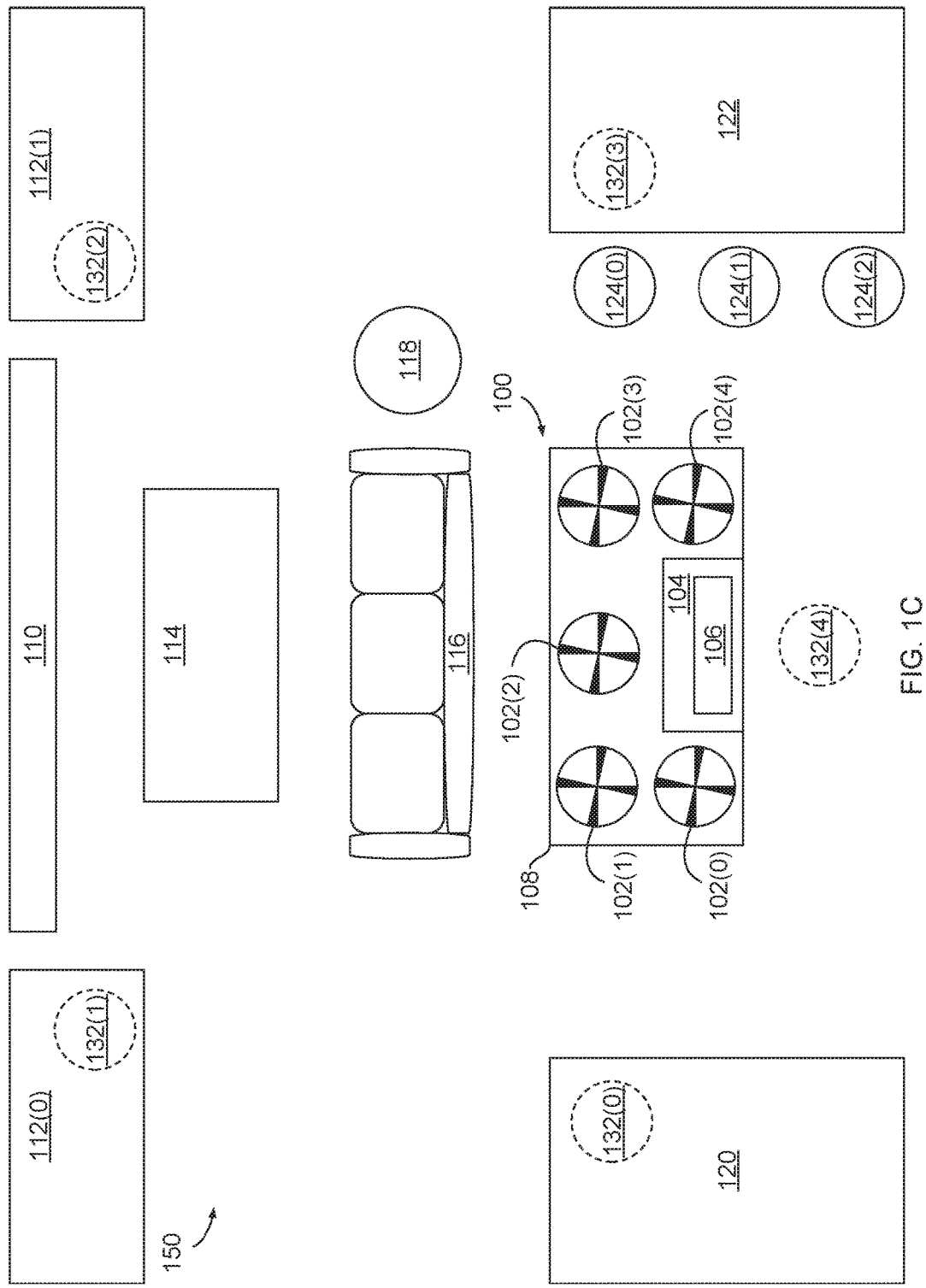

Referring now to FIG. 1C, after identifying a set of suitable surfaces within residential space 150, control application 106 then identifies specific perching locations 132 on those surfaces where DSUs 102 can safely perch or cause a speaker component to perch. Perching locations 132 may include flat, solid, obstruction-free areas where DSUs 102 may simply land. For example, a given perching location 132 could simply be a table. Perching locations may also include surfaces having particular textures to which DSUs 102 may become affixed. For example, a given perching location 132 could include a stucco wall where a DSU 102 could grapple using a claw. Perching locations 132 may also include specialized docking mounts where DSUs 102 or associated speakers can become securely mounted. For example, a given perching location 132 could include a magnetic pad to which a DSU 102 could be securely fastened via a magnet having reverse polarity. In the context of this disclosure, the term "perch" refers to the act of temporarily deriving stability from some object, either via resting on that object, temporarily being attached to that object, or both. As a general matter, perching locations may include floors, walls, ceilings, and surfaces of objects, among others, either independently of, or in conjunction with, dedicated perching elements. Additional types of perching may involve mechanical solutions, such as claws, vacuum suction, and so forth, magnetic and dry adhesive methods involving the Bernoulli Effect, and other adhesive techniques.

Figure 1D:
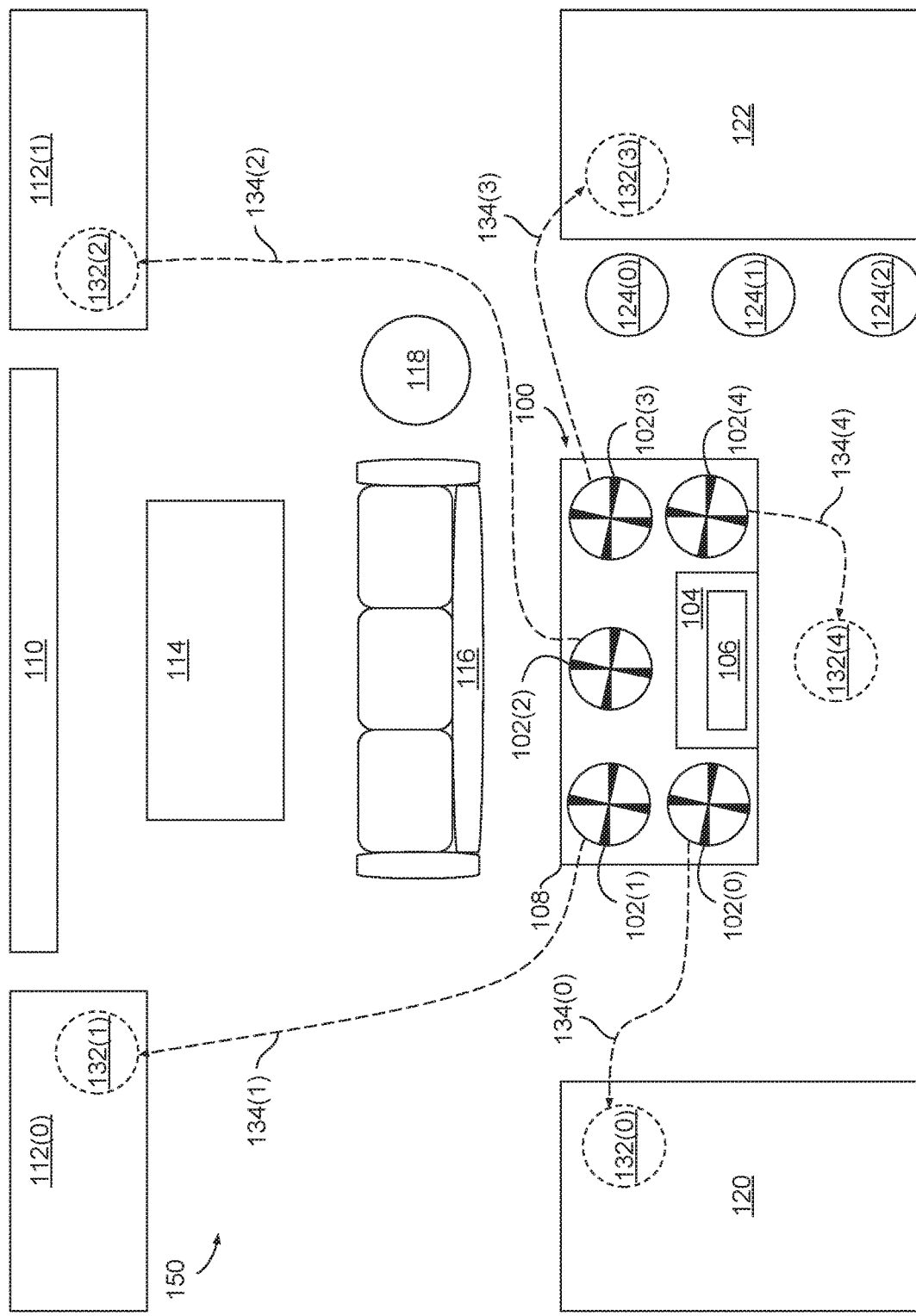

Referring now to FIG. 1D, once perching locations 132 have been identified, control application 106 then generates a flight plan for DSUs 102 that includes trajectories 134. As is shown, each trajectory 134 couples the starting location of a DSU 102 with a perching location 132. Control application 106 generates trajectories 134 in a manner that prevents DSUs 102 from colliding with the various fixtures in residential space 150 and prevents DSUs 102 from colliding with each other. In addition to including trajectories 132, the flight plan generated by control application 106 may also include specific flight commands to be executed at different points in time, including changes to control surfaces and/or motor parameters, among others. In embodiments where control application 106 is distributed across DSUs 106, each DSU 106 may navigate autonomously and may coordinate autonomous navigation with other DSUs 102.

Figure 1E:
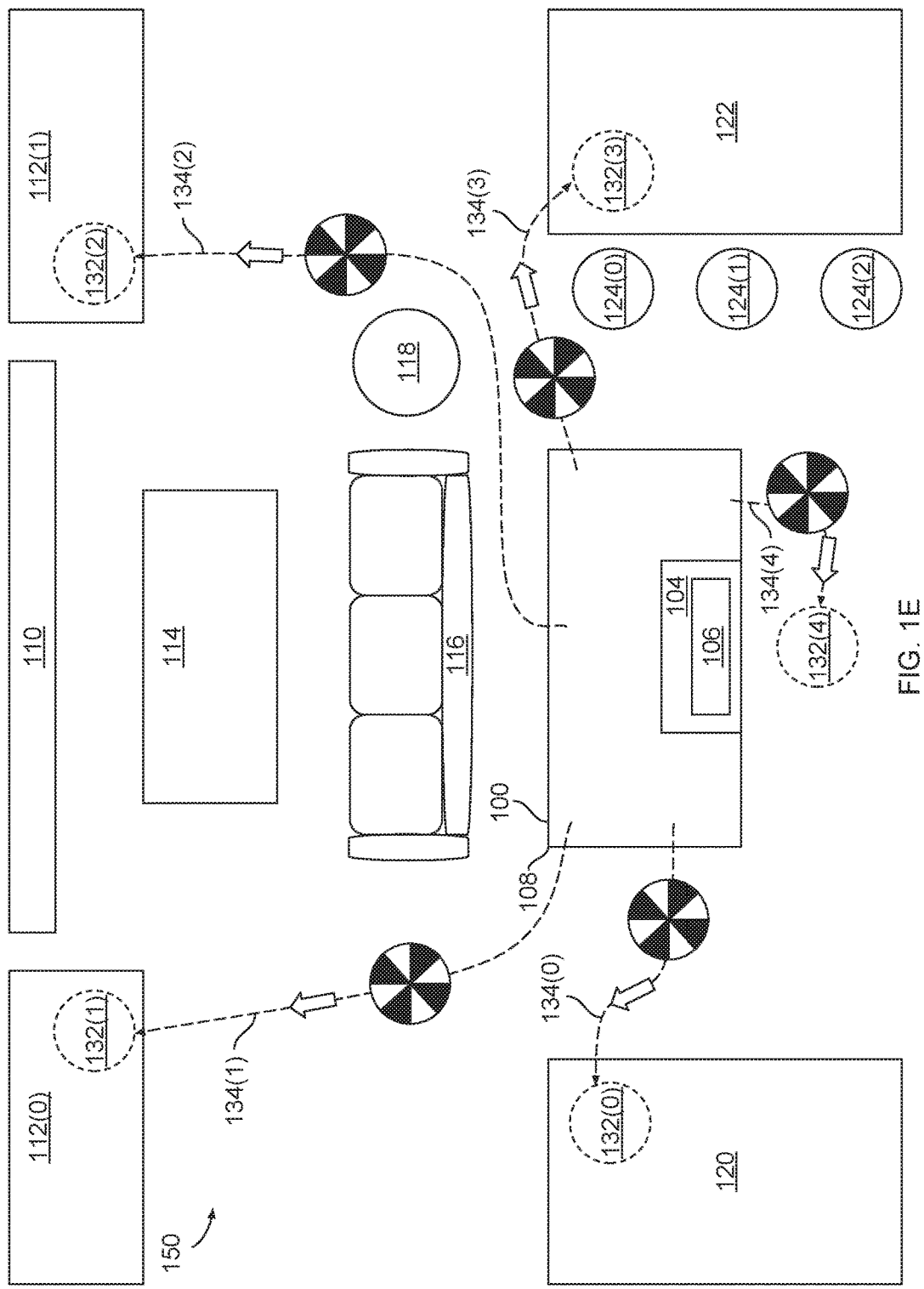

Referring now to FIG. 1E, after generating the flight plan discussed above, control application 106 deploys the fleet of DSUs 102 into residential space 150 along trajectories 134. Control application 106 may deploy all DSUs 102 simultaneously or coordinate incremental deployment of DSUs 102 over a time span. During flight, each DSU 102 may communicate with control application 106 to relay sensor data and other telemetry and also to receive commands. Each DSU 102 may also communicate with other DSUs 102 in a peer-to-peer (P2P) manner to coordinate navigation. A given DSU 102 generally processes sensor data in real-time in order to maintain controlled flight. For example, and without limitation, a DSU 102 could process video data recorded via an optical device, and would then process that video data to implement obstacle avoidance (including avoidance of people and animals).

Referring now to FIG. 1F, once DSUs 102 reach the respective perching locations 132, each DSU 102 performs a landing maneuver at the corresponding perching location 132. The specific landing maneuver performed by a given DSU 102 generally depends on parameters associated with the corresponding perching location 132. For example, and without limitation, if the perching location 132 is a flat table, then the DSU 102 configured to perch at that location may simply land on that table. However, if the perching location is a mechanical wall mount, then the DSU 102 configured to perch at that location would perform a mechanical attachment procedure to perch on that wall mount. Because each perching location 132 may have different parameters, each DSU 102 performs a landing maneuver that is appropriate for the corresponding perching location 132. In embodiments where the drone component of a given DSU 102 can decouple from the speaker component of the DSU 102, upon landing, the speaker component may perch at the corresponding perching location, and the drone component may then depart.

Once perched in the manner shown in FIG. 1F, DSUs 102 may begin generating acoustic signals 140. As mentioned previously, each DSU 102 includes a speaker component that is capable of playing music and other forms of audio streamed from control application 106. Accordingly, with the configuration shown, DSUs 102 can collectively generate sound fields within residential space 150.

Figure 2A:
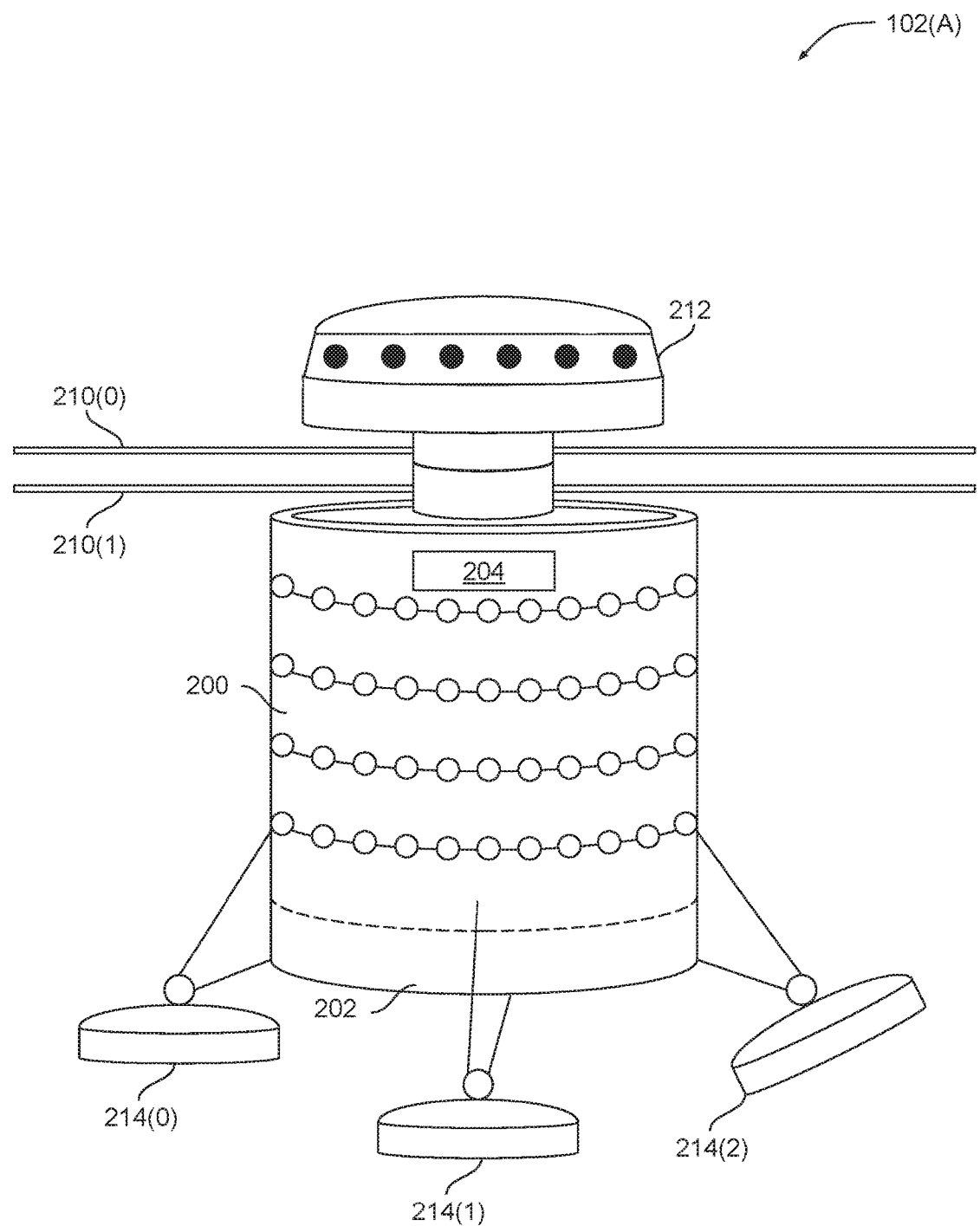

Referring generally to FIGS. 1A-1F, the techniques described thus far can be applied to autonomously configure a sound system, thereby eliminating human involvement from the configuration process. Accordingly, a user of the drone speaker system 100 does not need to manually measure residential space 150 and perform complex placement calculations, as required when configuring conventional sound systems. The user also does not need to manually place any speakers. In addition, and as described in greater detail below in conjunction with FIGS. 4A-8C, the basic approach described thus far can be extended to allow drone speaker system 100 to dynamically reconfigure DSUs 102 under various circumstances. FIGS. 2A-2C illustrate different variants according to which any given DSU 102 can be implemented.

FIGS. 2A-2C are more detailed illustrations of the drone speaker units of FIGS. 1A-1F, according to various embodiments. Any of DSUs 102 discussed herein may be implemented by any of the DSU variants set forth in conjunction with FIGS. 2A-2C.

As shown in FIG. 2A, DSU 102(A) includes a speaker 200, a battery 202, a drone computing device 204, rotor blades 210, sensor array 212, and perching mechanisms 214. Speaker 200 is an acoustic output device configured to generate sound waves. Battery 202 is an energy storage device that powers the various components of DSU 102(A). Battery 202 may be charged via wired or wireless charging.

Drone computing device 204 may execute an instance of control application 106, and is configured to coordinate the overall operation of DSU 102(A), as discussed in greater detail below in conjunction with FIGS. 3A-3C.

Rotor blades 210(0) and 210(1) are lifting surfaces that counter-rotate relative to one another and rotate relative to one or more swash plates, thereby providing lift for the purposes of flight. Rotor blades 210 may be folded and stored when DSU 102(A) is stationary. Drone computing device 204 may adjust the rotational speed of each set of rotor blades 210 independently of one another in order to rotate DSU 102(A) as a whole. In doing so, drone computing device 204 may issue commands to one or more motors (not shown) included in DSU 102(A). Drone computing device 102(A) may also adjust rotor blades 210 dynamically during flight in order to cause DSU 102 follow a given flight plan. For example, and without limitation, drone computing device 204 could adjust the blade angle of rotor blades 210 in a manner that induces propulsion and causes DSU 102 to move through space. Persons familiar with aeronautics in general and the dynamics of rotorcraft and multirotor aerial platforms in particular will understand how DSU 102 is capable of executing controlled flight.

Sensor array 212 may include any technically feasible collection of sensor devices, including optical input devices, stereoscopic cameras, infrared tracking systems, LIDAR scanners, radar units, radio frequency transceivers, time-of-flight sensors, coded light detectors, ultrasound sensors and so forth. Sensor array 212 generally captures sensor data in three dimensions in real-time. Sensor array 212 may include 3D sensors having a 360-degree panorama, or sensor array 212 may rotate in order to capture a 360-degree panorama over time.

Drone computing device 204 may process sensor data captured via sensor array 212 to perform several different tasks. Specifically, drone computing device 204 may process sensor data when performing the spatial mapping procedure discussed above in conjunction with FIG. 1B. Drone computing device 204 may also process sensor data to perform real-time autonomous navigation. In either case, drone computing device 204 performs object detection and identification, 3D spatial mapping, or other techniques for modeling a spatial environment. Drone computing device 204 may further process sensor data when communicating with other DSUs 102. In doing so, drone computing device 204 may coordinate any technically feasible form of P2P communication. Drone computing device 204 also coordinates landing maneuvers using perching mechanisms 214.

Each perching mechanism 214 includes one or more actuators that can rotate or in other ways reposition themselves in order to perform a landing maneuver. For example, as is shown, perching mechanism 214(2) may rotate to accommodate an angled surface (not shown). A given perching mechanism 214 may simply include a pad that supports DSU 102(A) when positioned on a flat surface, or may alternatively include more complex mechanisms for coupling to surface. For example, and without limitation, perching mechanisms 214 may include electromagnets that can be activated in order secure DSU 102(A) to a given surface or other object. In another example, and without limitation, perching mechanisms 214 may also include mechanical components, including claws, clips, latches, suction cups, quick release adhesives, and so forth, that can securely fasten DSU 102(A) at a particular position relative to a surface or other object. Perching mechanisms 214 may also be configured to couple to a dedicated wall mount that can be relocated via drone in order to perch DSU 102 at different locations.

In one embodiment, DSU 102(A) is coupled to a microfilament cable that prevents DSU 102(A) from falling to the ground if issues arise during perching. The microfilament cable may also provide power and act as a communication channel. In another embodiment, DSU 102(A) includes a parachute or airbag system that protects DSU 102(A) and others if DSU 102(A) experiences a flight malfunction. DSU 102(A) may also include active noise cancellation systems to mitigate sound produced during flight and/or implement mechanical optimizations, such as belt driven motors, to reduce noise.

DSU 102(A) described herein is an example of a DSU 102 where the speaker component and the drone component are integrated to form a single unit. However, DSUs 102 can also be implemented in a manner that allows one or more drone components to operate independently from a given speaker component. FIGS. 2B-2C illustrate examples of these implementations.

As shown in FIG. 2B, DSU 102(B) includes a drone 220 and a speaker module 230 that are separate from one another yet configured to be coupled together. Drone 220 includes rotor blades 220, sensor array 224, and clamping mechanisms 226. Drone 220 also includes a drone computing system 204 and a power source (not shown). Speaker module 230 includes a speaker 232 and a battery 234. Drone 220 is configured to perform a clamping operation in order to couple with speaker module 230. In doing so, drone component 220 may hover over speaker module 232 and then activate clamping mechanism 226 to clamp speaker module 230. In other embodiments, drone component 220 may approach speaker module 232 from the side or scoop speaker module 232 from below when coupling to speaker module 232

Once coupled in the manner shown, drone 220 carries speaker module 230 to a perching location 132 and then coordinates a perching operation. Drone 220 may simply set speaker module 230 down onto a perching location 132. Or, with more complex perching hardware, such as that shown in FIG. 2A, speaker module 220 could couple with the perching location 132. Drone 220 may then detach from speaker module 230 and return to hub 108. Drone 220 may, at times, return to a given speaker module 230 and retrieve that speaker module for battery recharging. In doing so, drone 220 may place a given speaker module 230 into hub 108 until battery 234 is recharged, and then return that speaker module 230 to the corresponding perching location 132. One advantage of DSU 102(B) is that one drone 220 may place any number of speaker modules 230, thereby limiting the number of drones 220 needed to one, at the very least. FIG. 2C illustrates yet another implementation that includes non-integrated drone components and speaker components.

As shown in FIG. 3C, DSU 102(C) includes a pair of drones 240 that cooperatively carry a speaker module 250. Each drone 240 includes an instance of a drone computing device 204 configured to manage flight operations. Drones 240 communicate with one another to coordinate flight operations via wireless link 242. Wireless link 242 may be a Bluetooth® connection or any other technically feasible form of data link. Speaker module 250 includes a speaker 252, a battery 254, and a mounting point 256. Drones 240 are configured to couple to mounting point 256 via a filament 260. As shown, filament 260 is coupled to both mounting point 256 and drones 240.

This particular implementation may be applied in situations where a single drone 240 cannot lift a particular speaker module. For example, and without limitation, a given drone 240 may not be capable of lifting a large subwoofer. However, two (or more) such drones may have the combined lifting capacity to cooperatively carry the subwoofer to a perching location 132.

Referring generally to FIGS. 2A-2C, persons skilled in the art will understand that any of the techniques associated with one DSU variant may be applied to any of the other DSU variants. In addition, those skilled in the art will understand how the different DSU variants may be implemented in conjunction with one another as part of a single drone speaker system 100. For example, and without limitation, a given drone speaker system may include several instances of DSU 102(A) shown in FIG. 2A for deploying smaller speakers, as well as multiple other drones 220 and/or 240 for placing standalone speaker modules. In addition, those skilled in the art will recognize that the various techniques described herein are provided for exemplary purposes only and not meant to be limiting in scope. As a general matter, any flight-capable unit that includes one or more drone components and one or more speaker components, integrated or nonintegrated, falls within the scope of the present disclosure. FIGS. 3A-3C discuss hub computing device 104, drone computing device 204, and control application 106 in greater detail.

Figure 3A:
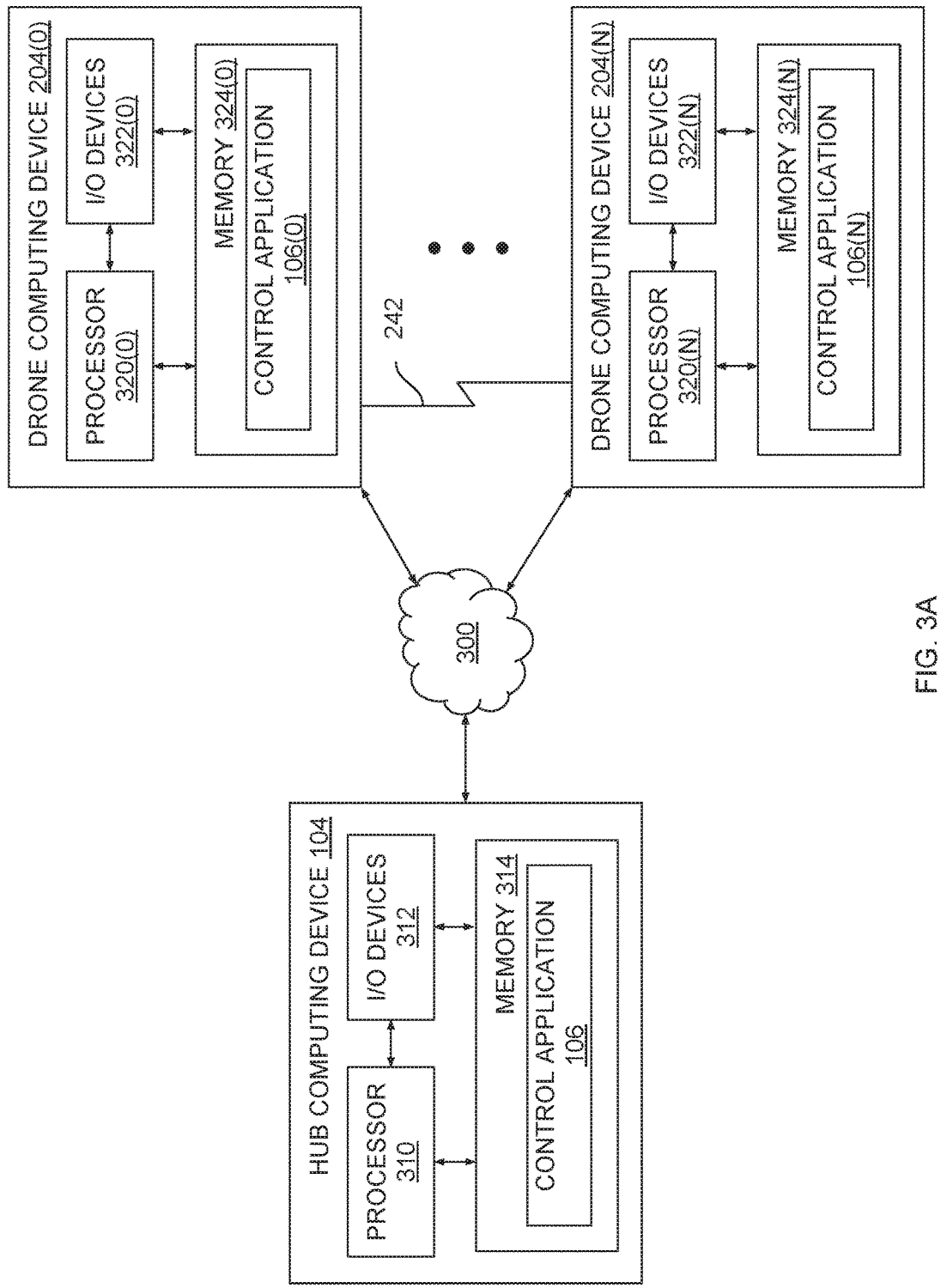
Figure 3B:
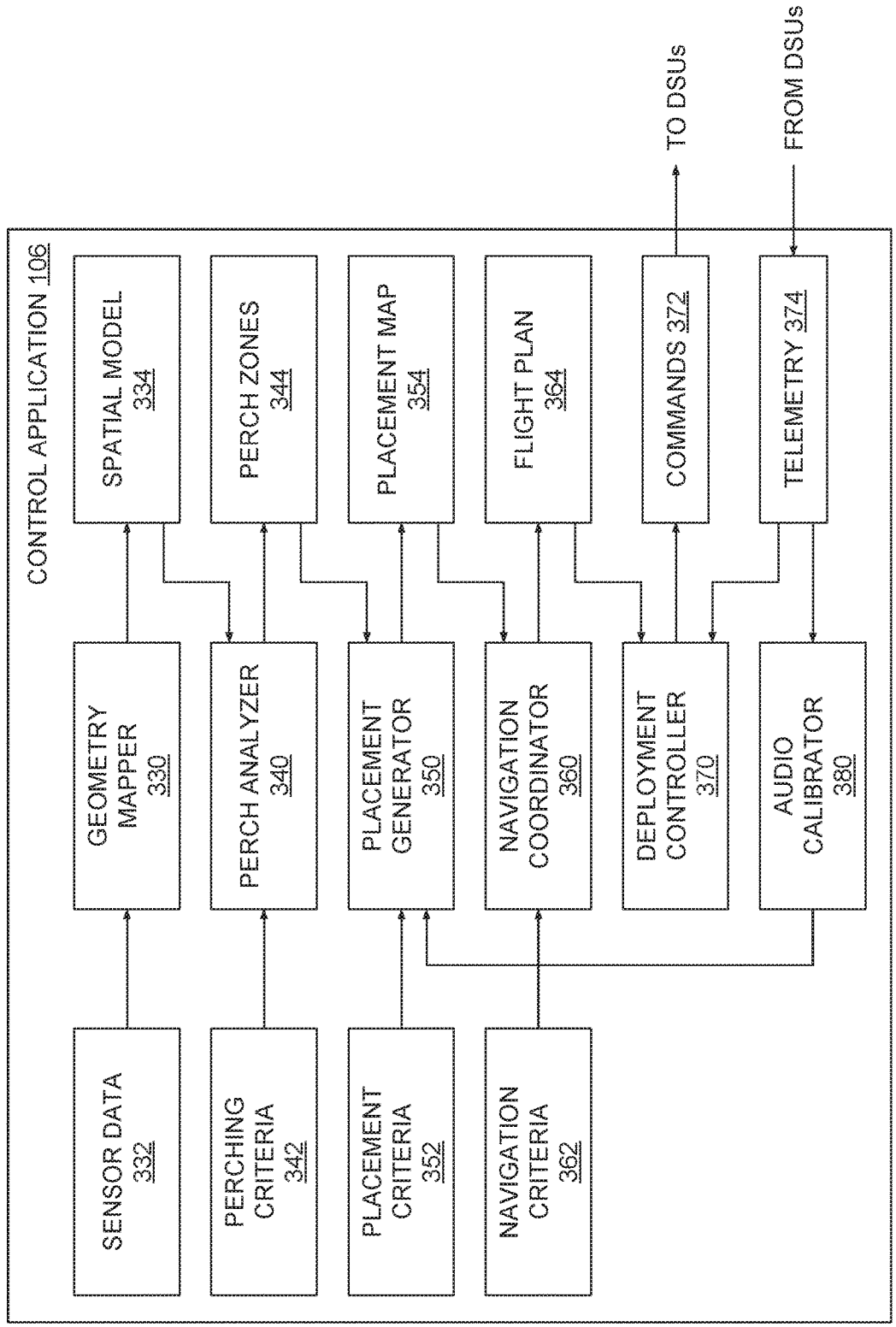

FIGS. 3A-3C illustrate various computing devices that execute the control application of FIGS. 1A-1F, according to various embodiments. As shown in FIG. 3A, hub computing device 104 is coupled to drone computing devices 204(0) through 204(N) via a network 300. Network 300 may be a WiFi™ network or any other technically feasible data exchange mechanism. Network 300 may also be omitted, and hub computing device 300 may communicate directly with each drone computing device 204, for example, via Bluetooth®, without limitation. Similarly, drone computing devices 204 may communicate with one another via network 300 or directly via P2P connections 242.

Hub computing device 104 includes a processor 310, input/output (I/O) devices 312, and memory 314, coupled together. Processor 310 may be any technically feasible hardware unit configured to process data and execute program instructions. Processor 310 could be, for example, and without limitation, a central processing unit (CPU), a graphics processing unit (GPU), an application specific integrated circuit (ASIC), and any combination thereof. I/O devices 312 include devices for receiving input, devices for providing output, and devices for both receiving and providing output. For example, and without limitation, I/O devices 312 could include a touchscreen configured to receive input and provide output. Memory 314 may include any technically feasible storage medium for storing data and software applications. Memory could be, for example, a random-access memory (RAM) module. Memory 314 includes control application 106. When executed by processor 310, control application 106 performs the various operations discussed above and discussed in greater detail below.

Each drone computing device 204 includes a processor 320, I/O devices 322, and memory 324. A given processor 320 may be any technically feasible hardware unit configured to process data and execute program instructions, including a CPU, a GPU, an ASIC and so forth. A given set of I/O devices 322 include devices for receiving input, devices for providing output, and devices for both receiving and providing output, such as a touchscreen, among others. Each memory 324 may include any technically feasible storage medium for storing data and software applications, including a RAM module among others. Each memory 324 includes an instance of a control application 106.

The various control applications 106 and 106(0) through 106(N) shown in FIG. 3A may represent a distributed software entity configured to interoperate to perform any and all operations discussed herein. Those operations include generating spatial maps, determining perch locations, generating flight plans, and coordinating the flight and placement operations implemented by DSUs 102, among other things. As such, the descriptions that follow pertaining to control application 106 may also apply to control applications 106(0) through 106(N). FIG. 2B illustrates an exemplary control application 106 in greater detail.

As shown in FIG. 3B, control application 106 includes a geometry mapper 330, a perch analyzer 340, a placement generator 350, a navigation coordinator 360, a deployment controller 370, and an audio calibrator 380.

Geometry mapper 330 is a software module configured to analyze sensor data 332 to generate spatial model 334. Sensor data 332 may be captured by one or more DSUs 102 during the exploratory sweep discussed above in conjunction with FIG. 1B. Spatial model 332 is a geometrical model of an environment where drone speaker system 100 is deployed, such as residential space 150 of FIGS. 1A-1F.

Perch analyzer 340 is a software module configured to analyze spatial model 334 based on perching criteria 342 to generate perch zones 344. Perching criteria 342 characterizes geometrical spaces where a DSU 102 can perch. For example, and without limitation, perching criteria 342 could describe flat, stable, geometrical surfaces with at least a minimum area clear from obstructions. Perching criteria 342 may also include one or more trained neural networks configured to analyze spatial model 334 to identify perch zones 344. Exemplary perch criteria are shown in FIG. 3C. Perch zones 334 indicate any set of surfaces or positions suitable for DSU 102 perching.

Placement generator 350 is a software module configured to analyze perch zones 344 based on placement criteria 352 to generate placement map 354. Placement criteria 352 indicate specific objectives and constraints associated with the placement of DSUs 102 relative to an environment and relative to one another. Placement criteria 352 may also indicate specific configurations of DSUs 102 that represent known sound system setups. For example, and without limitation, placement criteria 352 could include geometrical constraints associated with a 5.1 stereo surround sound configuration to be implemented by drone speaker system 100. With this configuration, each DSU 102 may be associated with a different audio channel. Placement criteria 352 may be pre-programmed into control application 106 and/or customized by a user. Exemplary placement criteria are shown in FIG. 3C. Placement map 354 includes specific perching locations 132 for a given DSU configuration.

Navigation coordinator 360 is a software module configured to analyze placement map 354 based on navigation criteria 362 to generate flight plan 364. Navigation criteria 362 indicates various conditions associated with the flight of DSUs 102 that must remain met during flight. For example, and without limitation, navigation criteria 362 may indicate that DSUs 102 cannot fly over, or near, humans. Flight plan 364 may include various trajectories, such as trajectories 134 shown in FIG. 1D, that DSUs 102 traverse during deployment.

Deployment controller 370 is a software module configured to analyze flight plan 364 and to then generate commands 372 to be sent to DSUs 102 in real-time, thereby causing those DSUs to execute flight plan 364. Deployment coordinator 370 receives telemetry 374 and potentially other communications from DSUs 102 during and after flight.

Audio calibrator 380 is a software module configured to calibrate a sound field generated via DSUs 102 (or the associated speaker components) once initial deployment is complete. Audio calibrator 380 may analyze test frequencies in order to determine whether DSU placement is adequate to achieve a desired sound quality or specific set of acoustic characteristics. Audio calibrator 380 may calibrate the aforementioned sound field by modulating audio output on a per-speaker basis or by causing placement generator 350 to initiate placement modifications.

As a general matter, the various software modules discussed herein may interoperate on a real-time basis to allow design engine 106 to implement any of the various techniques described herein. In addition, the different software modules discussed may be distributed across different computing devices in any technically fashion. As mentioned, perching criteria 342 and placement criteria 352 are described in greater detail below in conjunction with FIG. 3C.

As shown in FIG. 3C, perching criteria 342 includes obstruction characteristics 342(0), geometry characteristics 342(1), texture characteristics 342(2), stability characteristics 342(3), availability characteristics 342(4), and mounting characteristics 342(5). Perch analyzer 340 of FIG. 3B may process spatial model 334 based on these different characteristics to identify regions of an environment that are free from obstructions, have specific geometry, include one or more particular textures, have a certain level of estimated stability, are currently available for perching, and/or include mounting points for affixing a DSU 102. The characteristics shown are exemplary, and perching criteria 342 may include other characteristics as well.

As also shown, placement criteria 352 includes sound field characteristics 352(0), hotspot characteristics 352(1), and positioning characteristics 352(2). Placement generator 350 of FIG. 3B may process perch zones 344 based on these different characteristics to generate a specific DSU placement (reflected in placement map 354) capable of generating a particular type of sound field, potentially with a precisely localized hotspot, and with speaker positions that adhere to certain positioning guidelines. The characteristics shown here are also exemplary, and placement criteria 352 may include other characteristics as well.

Referring generally to FIGS. 1A-3C, drone speaker system 100 advantageously lifts the burden of stereo system configuration and calibration from the user. Accordingly, users who are unfamiliar with stereo system setup may enjoy high-quality sound without being exposed to the complexities typically associated with setup of conventional systems. The techniques described thus far may be applied in a variety of different potential scenarios, some of which are described by way of example below in conjunction with FIGS. 4A-9C. Although these examples are directed towards DSU implementations having integrated drone and speaker components, persons skilled in the art will understand how any of the DSU variants set forth in conjunction with FIGS. 2A-2C may perform the techniques described below.

Applications of a Drone Speaker System

Figure 4A:
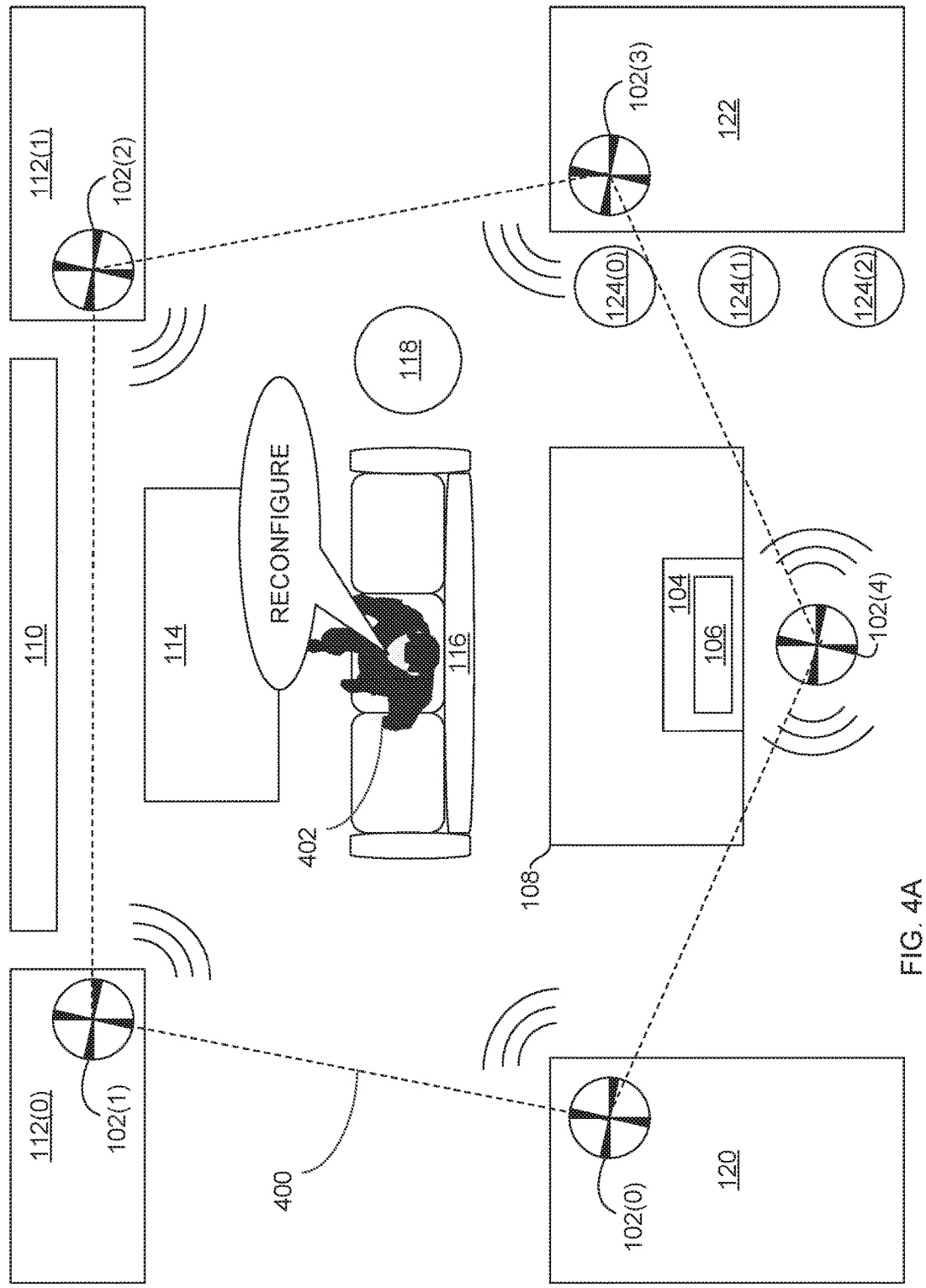
FIGS. 4A-4C illustrate how the drone speaker system of FIGS. 1A-1F repositions a fleet of drone speaker units to achieve different sound fields, according to various embodiments.
Figure 4B:
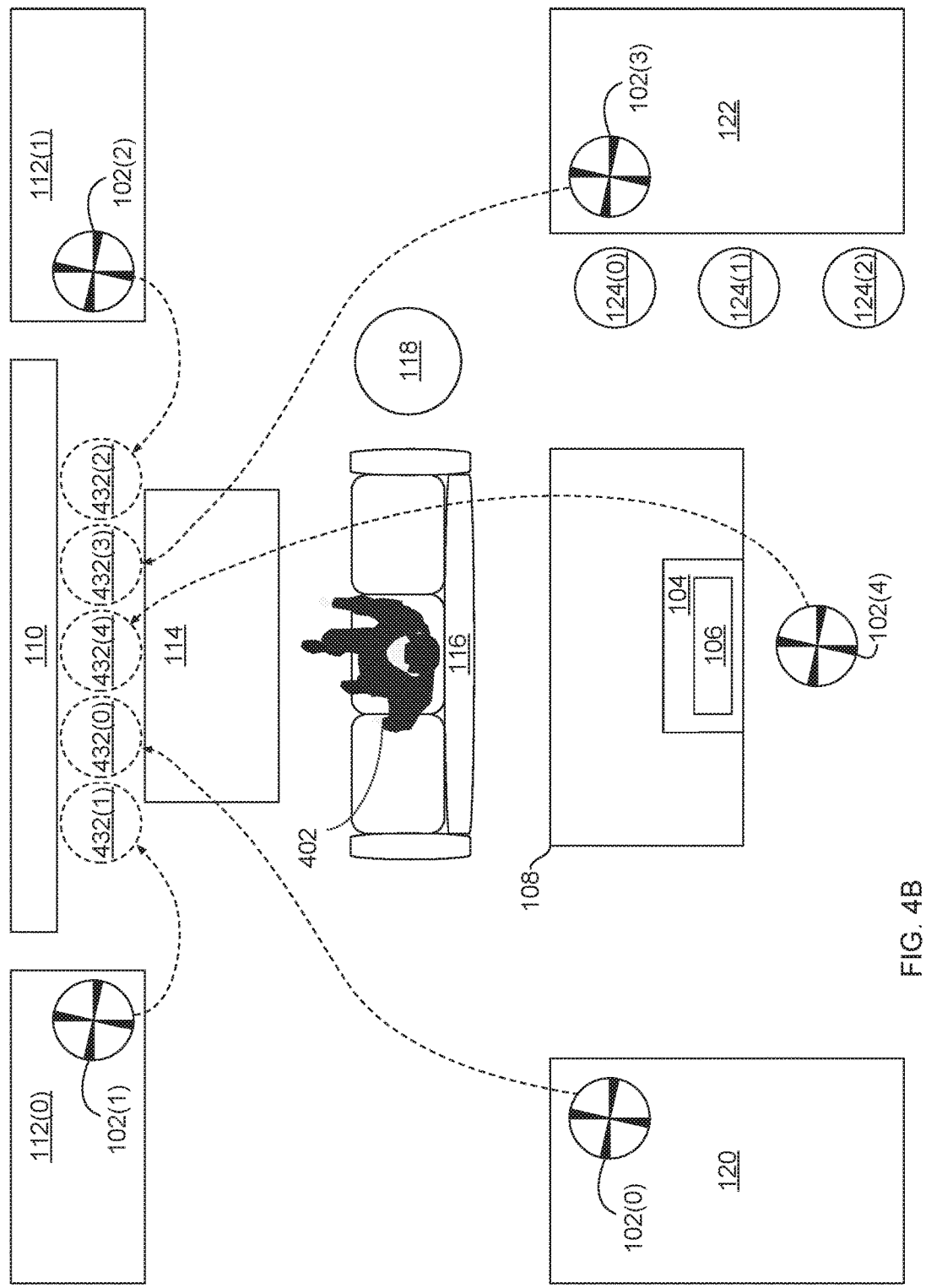
Figure 4C:
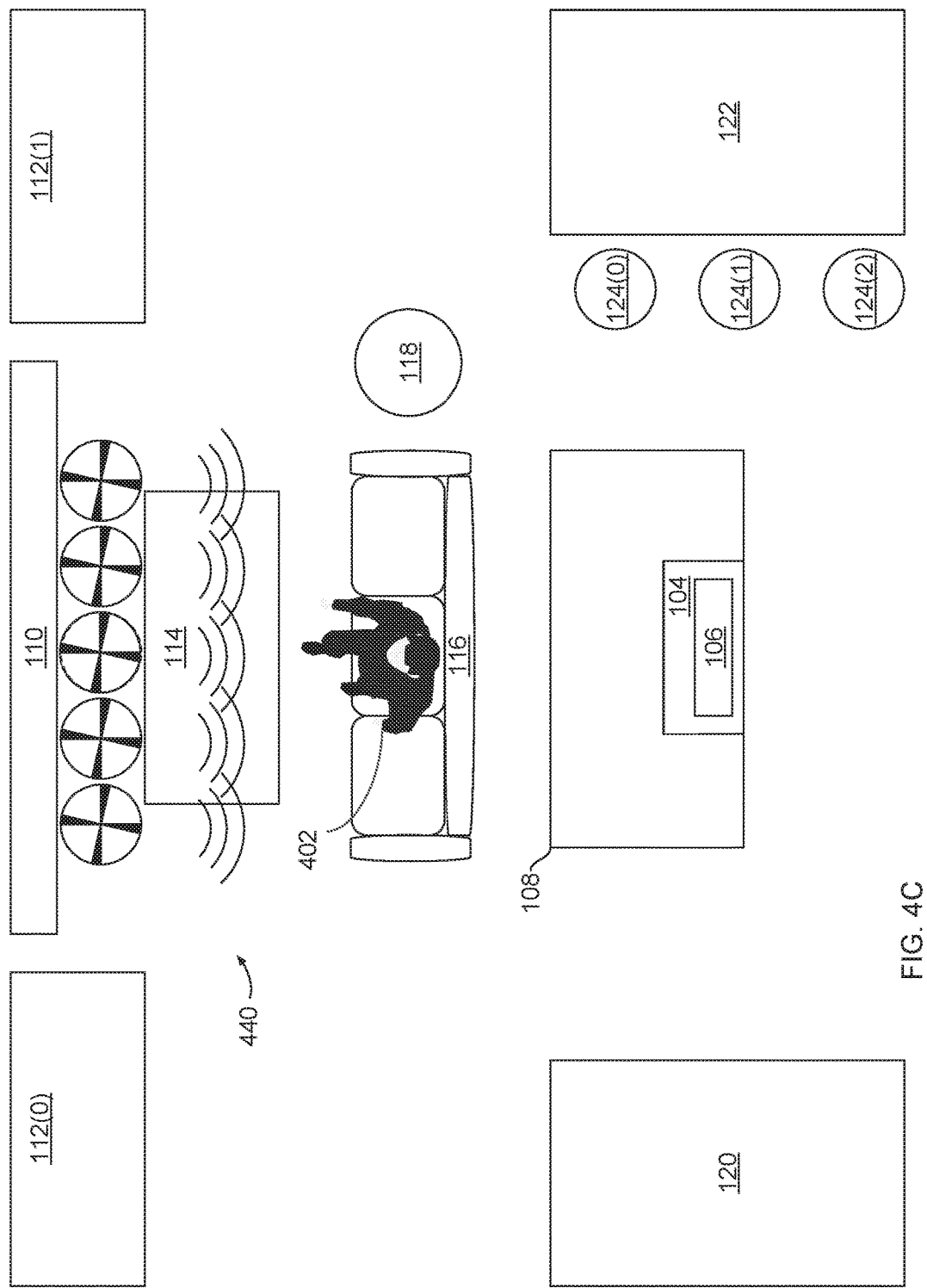

FIGS. 4A-4C illustrate how the drone speaker system of FIGS. 1A-1F repositions a fleet of drone speaker units to achieve different sound fields, according to various embodiments. As shown in FIG. 4A, DSUs 102 are initially placed according to configuration 400. Configuration 400 could be, for example and without limitation, a surround sound configuration that generates a surround sound hotspot near a listener 402. Listener 402 may desire a different configuration, however, that potentially offers different sound field characteristics. To effect reconfiguration, listener 402 commands drone speaker system 100 to reconfigure.

Referring now to FIG. 4B, in response to the reconfigure command, control application 106 generates a new placement map that includes new perching locations 432. In doing so, control application 106 may rely on a previously generated spatial map or generate a new spatial map, and then identify perching locations 432 based on that map. Perching locations 432 meet perching criteria 342 as well as placement criteria 352. Placement criteria 352 may indicate specific relative positioning for DSUs 102 in order to achieve a desired configuration. Control application 106 generates a flight plan for reconfiguring DSUs 102 and then redeploys those DSUs 102. Referring now to FIG. 4C, DSUs 102 travel to the respective perching locations 432 to achieve new configuration 440. In the example shown, configuration 440 is a sound bar configuration. In one embodiment, DSUs 102 may clip onto a sound bar scaffold in order to achieve configuration 440.

An advantage of the technique described above is that drone speaker system 100 can reconfigure DSUs 102 autonomously and without requiring a human to perform complex measurements, calculations, or manual placement of speakers. This approach can also be applied to reconfigure DSUs 102 within different locations, as described below in conjunction with FIGS. 5A-5C.

Figure 5A:
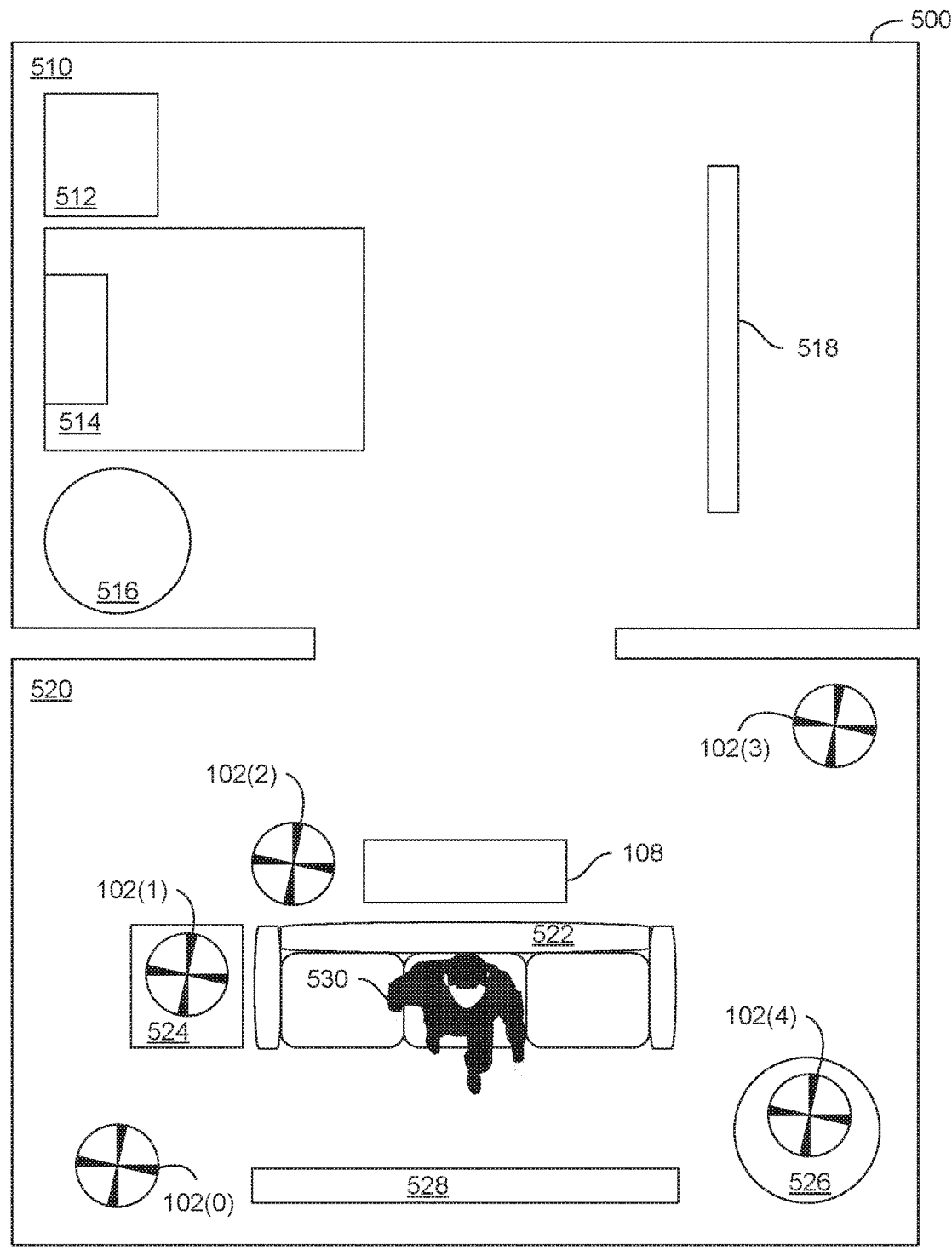
FIGS. 5A-5C illustrate how the drone speaker system of FIGS. 1A-1F repositions a fleet of drone speaker units to generate a sound field in a different location, according to various embodiments.
Figure 5B:
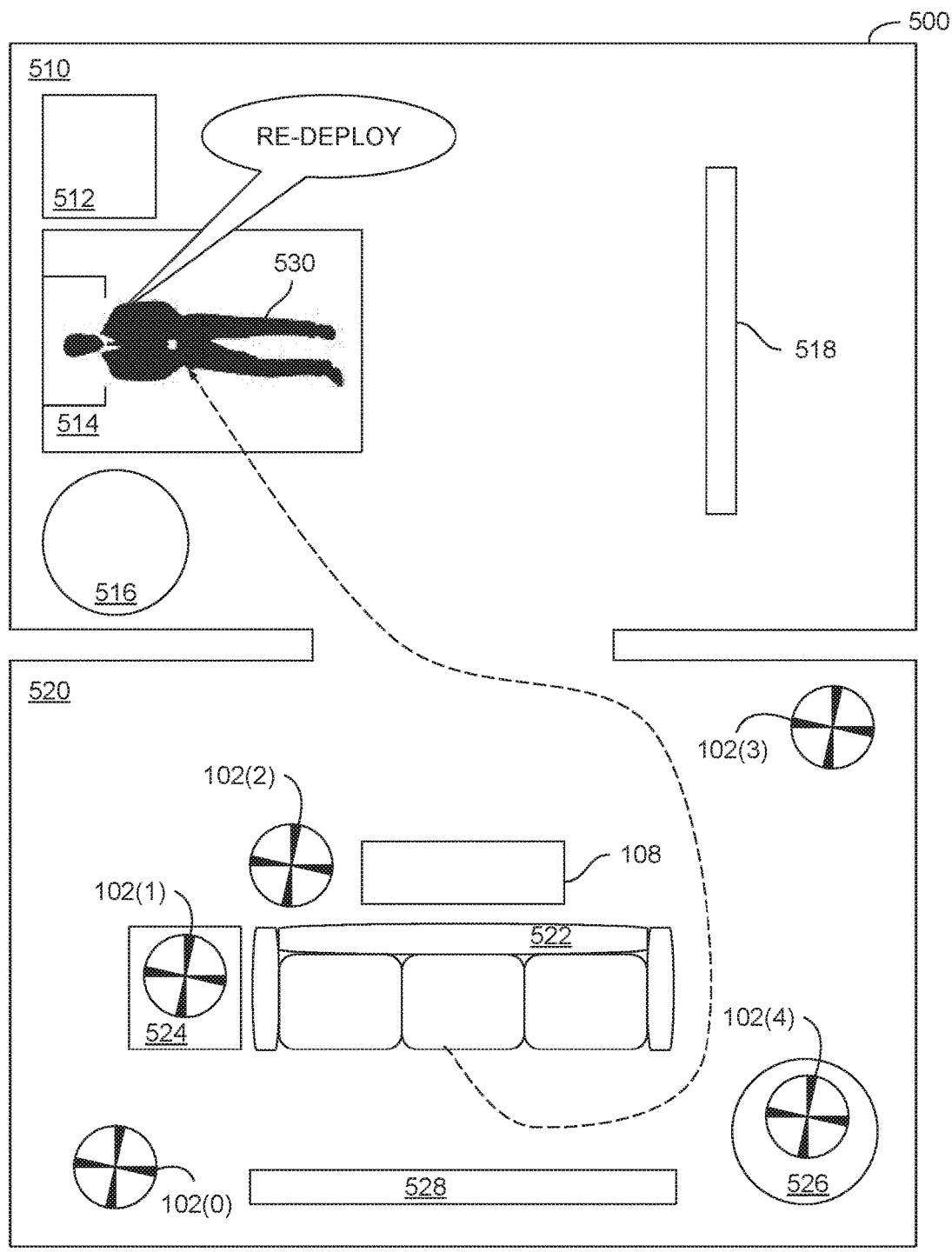
Figure 5C:
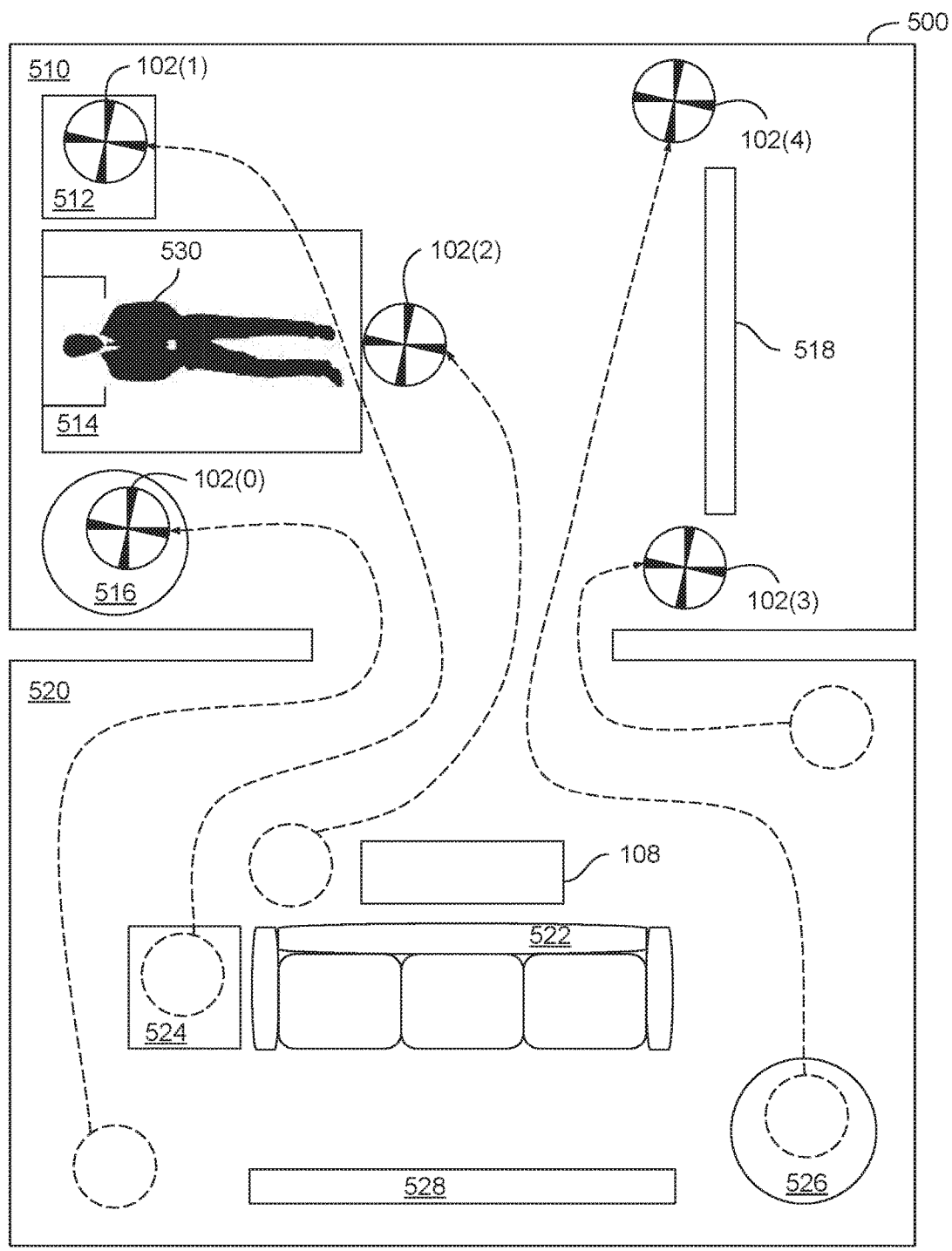

FIGS. 5A-5C illustrate how the drone speaker system of FIGS. 1A-1F repositions a fleet of drone speaker units to generate a sound field in a different location, according to various embodiments. As shown in FIG. 5A, a living space 500 includes a bedroom 510 and a living room 520. Bedroom 510 includes various furniture and fixtures, including nightstand 512, bed 514, table 516, and flat screen TV 518. Living room 520 also includes various furniture and fixtures, including sofa 522, side table 524, table 526, and flat screen TV 528. Initially, listener 530 resides in living room 520 and DSUs 102 are configured in the manner shown.

Referring now to FIG. 5B, listener 530 exits living room 520 and retreats to bedroom 510. However, DSUs 102 remain in living room 520 and, consequently, do not generate a sound field that is optimized for the new location of listener 530. Listener 530 may then issue a command to redeploy DSUs 102. Referring now to FIG. 5C, in response to the redeployment command, control application 106 identifies perching locations within bedroom 510, generates a flight plan, and redeploys DSUs 102 to new locations within bedroom 510. Listener 530 may then continue to enjoy high quality sound without needing to manually reconfigure any speakers. In one embodiment, DSUs 102 may also return to hub 108 at the command of listener 530, thereby allowing drone speaker system 100 to be stored when not in use. Drone speaker system 100 may also reposition DSUs 102 dynamically during operation, as discussed in greater detail below in conjunction with FIGS. 6A-6C.

Figure 6A:
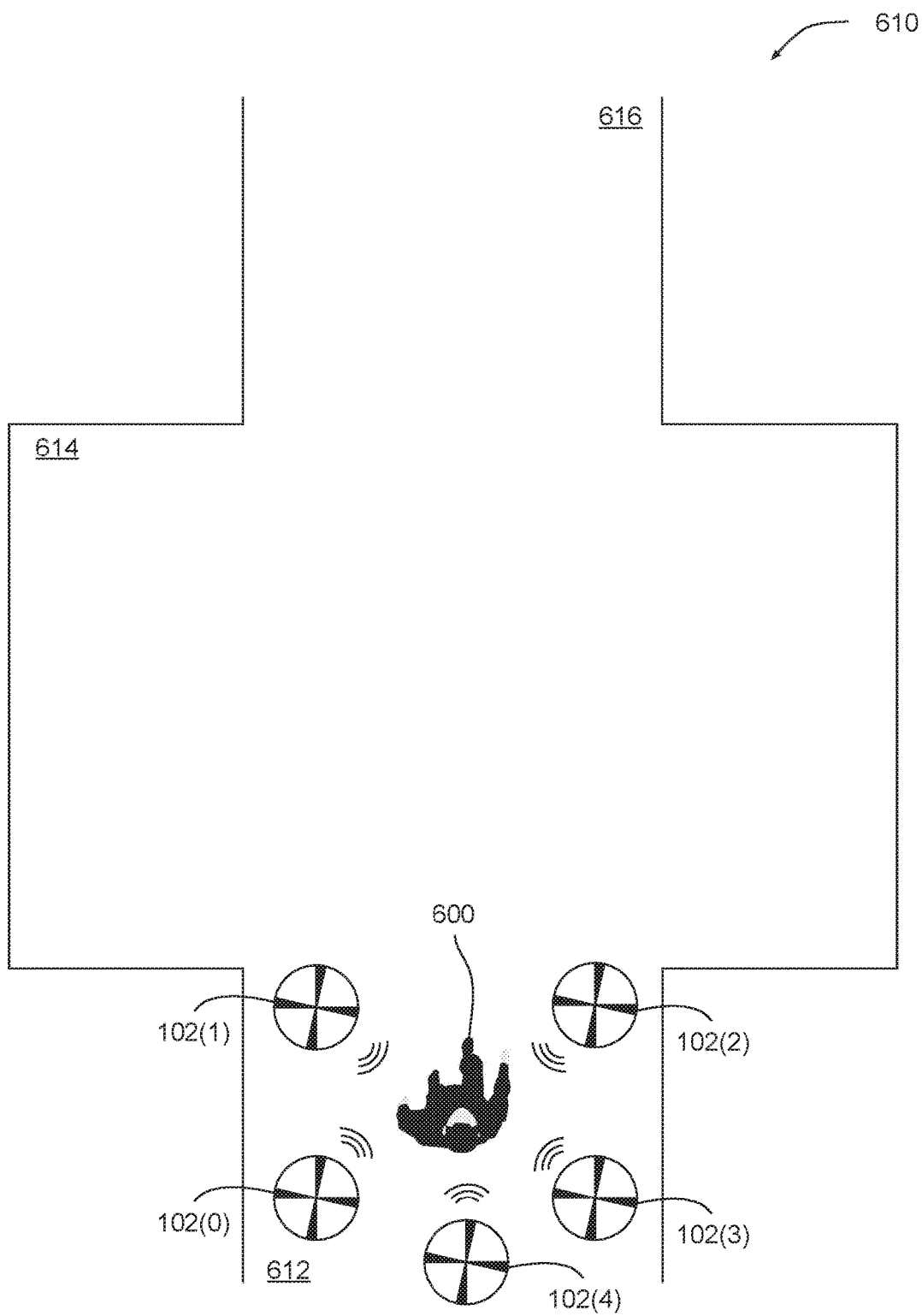
FIGS. 6A-6C illustrate how the drone speaker system of FIGS. 1A-1F repositions a fleet of drone speaker units in response to a changing listener location, according to various embodiments.
Figure 6B:
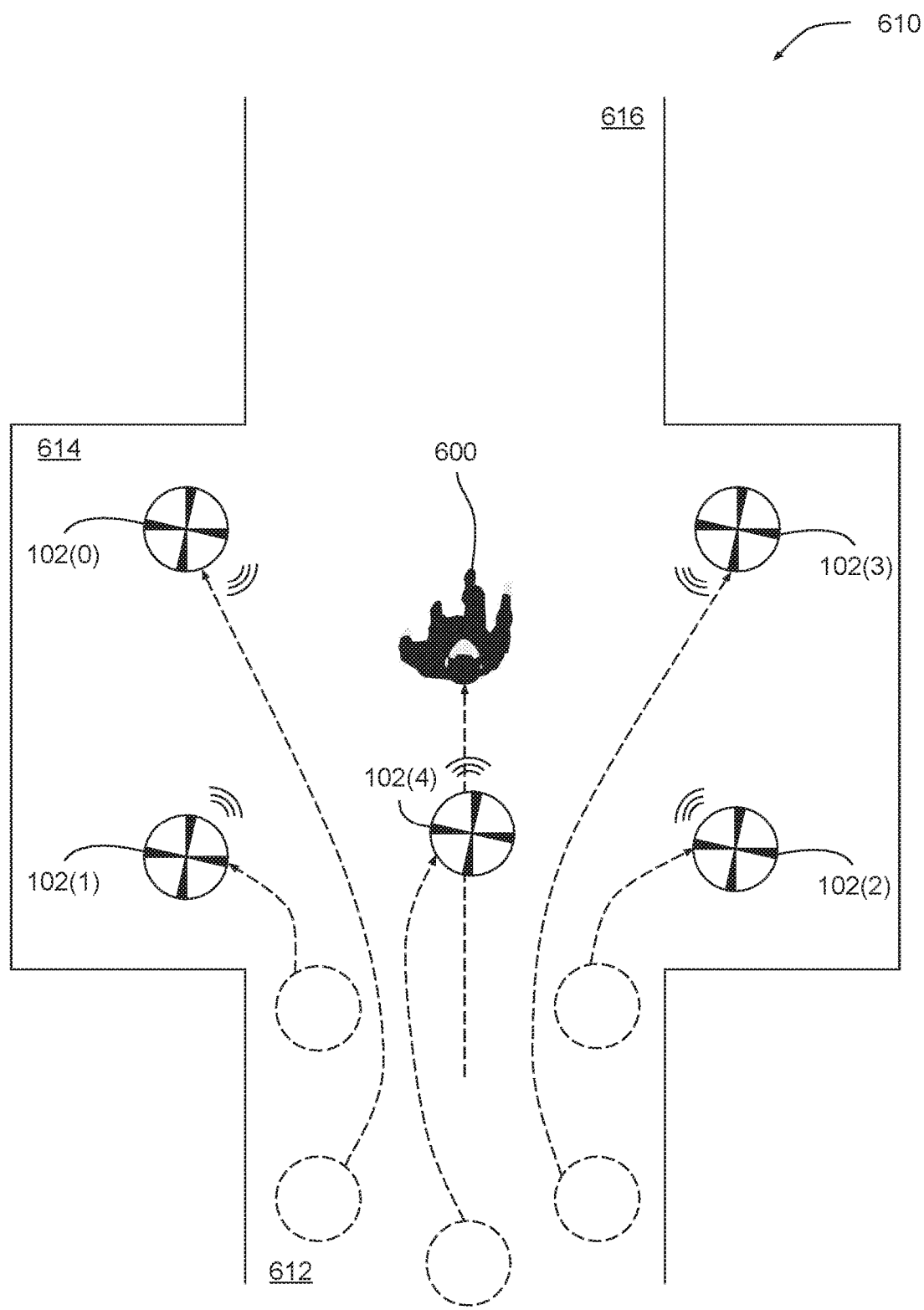
Figure 6C:
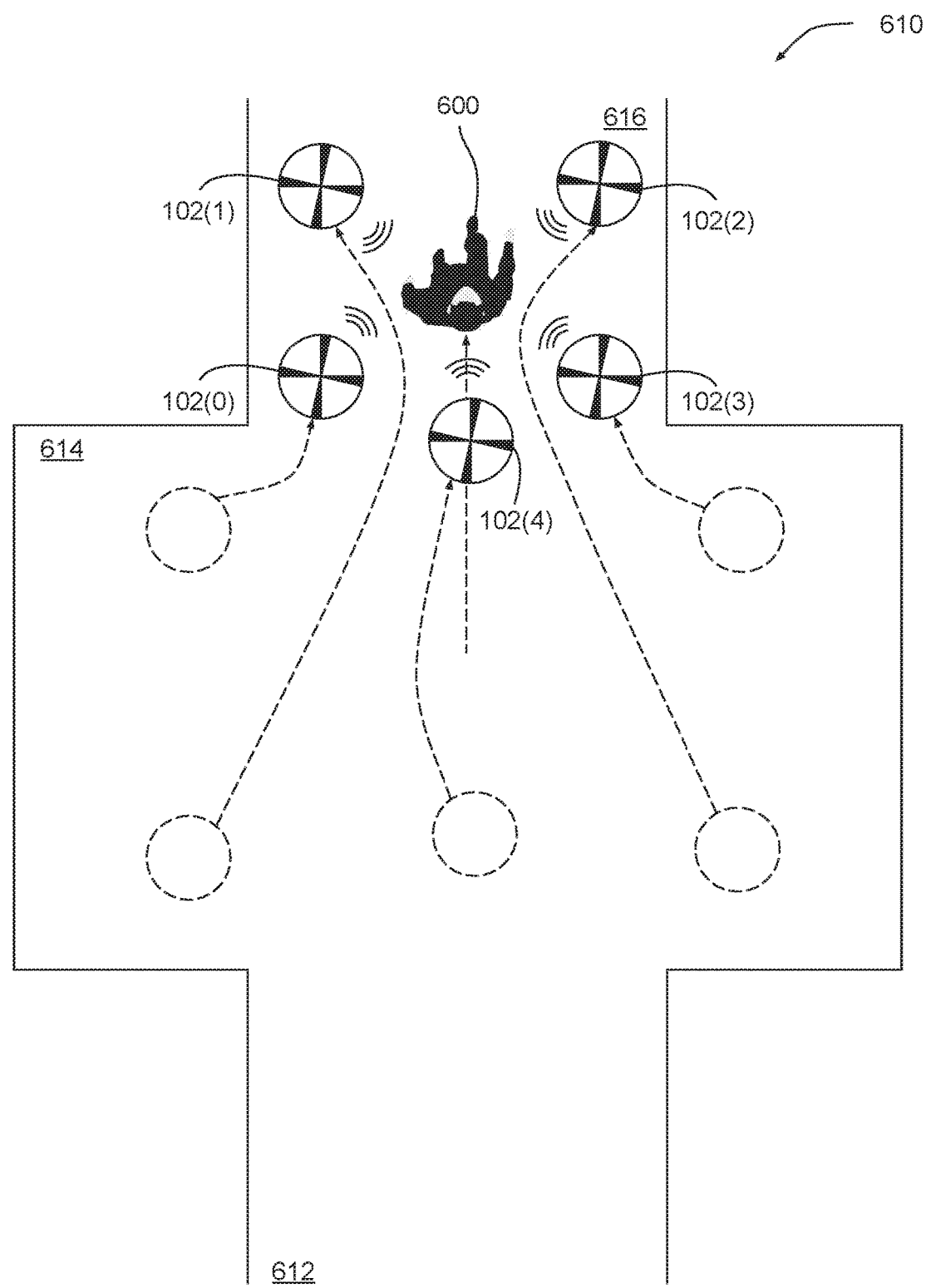

FIGS. 6A-6C illustrate how the drone speaker system of FIGS. 1A-1F repositions a fleet of drone speaker units in response to a changing listener location, according to various embodiments. As shown in FIG. 6A, a listener 600 traverses a space 610 that includes a constricted region 612, an open region 614, and another constricted region 616. Initially, control application 106 causes DSUs 102 to hover in relative proximity to listener 600 and generate a sound field centered on listener 600. As listener moves forward, DSUs 102 maintain formation until listener 600 enters open region 614.

Referring now to FIG. 6B, once listener 600 enters open region 614, control application 106 causes DSUs 102 to assume new positions that reflect the geometrical attributes of open region 614. In doing so, control application 106 may generate a new spatial map that represents open region 614, identify new perching locations, generate a flight plan, and cause DSUs 102 to travel to those new perching locations. In this example, a perching location may be a position in 3D space where a DSU 102 hovers. Control application 106 may perform this process dynamically and in real-time, thereby continuously remapping the environment and repositioning DSUs 102. Referring now to FIG. 6C, once listener 600 leaves open region 614 and enters constricted region 616, control application 106 causes DSUs 102 to assume a tighter formation in order to respect the reduced amount of space afforded by constricted region 616. In doing so, control application 106 may perform the dynamic remapping and repositioning technique mentioned above.

With the approach described in conjunction with FIGS. 6A-6C, one "master" DSU 102 may execute control application 106 and coordinate deployment, or an application executing on a mobile device carried by listener 600 may coordinate deployment, among other possibilities. One advantage of this approach is that drone speaker system 100 can generate a sound field with consistent quality as listener 600 moves between areas with different acoustic properties. This technique may also be combined with the approach described in conjunction with FIGS. 5A-5C, thereby allowing DSUs 102 to follow a listener between listening environments and then assume a static configuration at a final destination. Drone speaker system 100 can also reposition DSUs 102 without completely reconfiguring those DSUs 102, as described in greater detail below in conjunction with FIGS. 7A-7C.

Figure 7A:
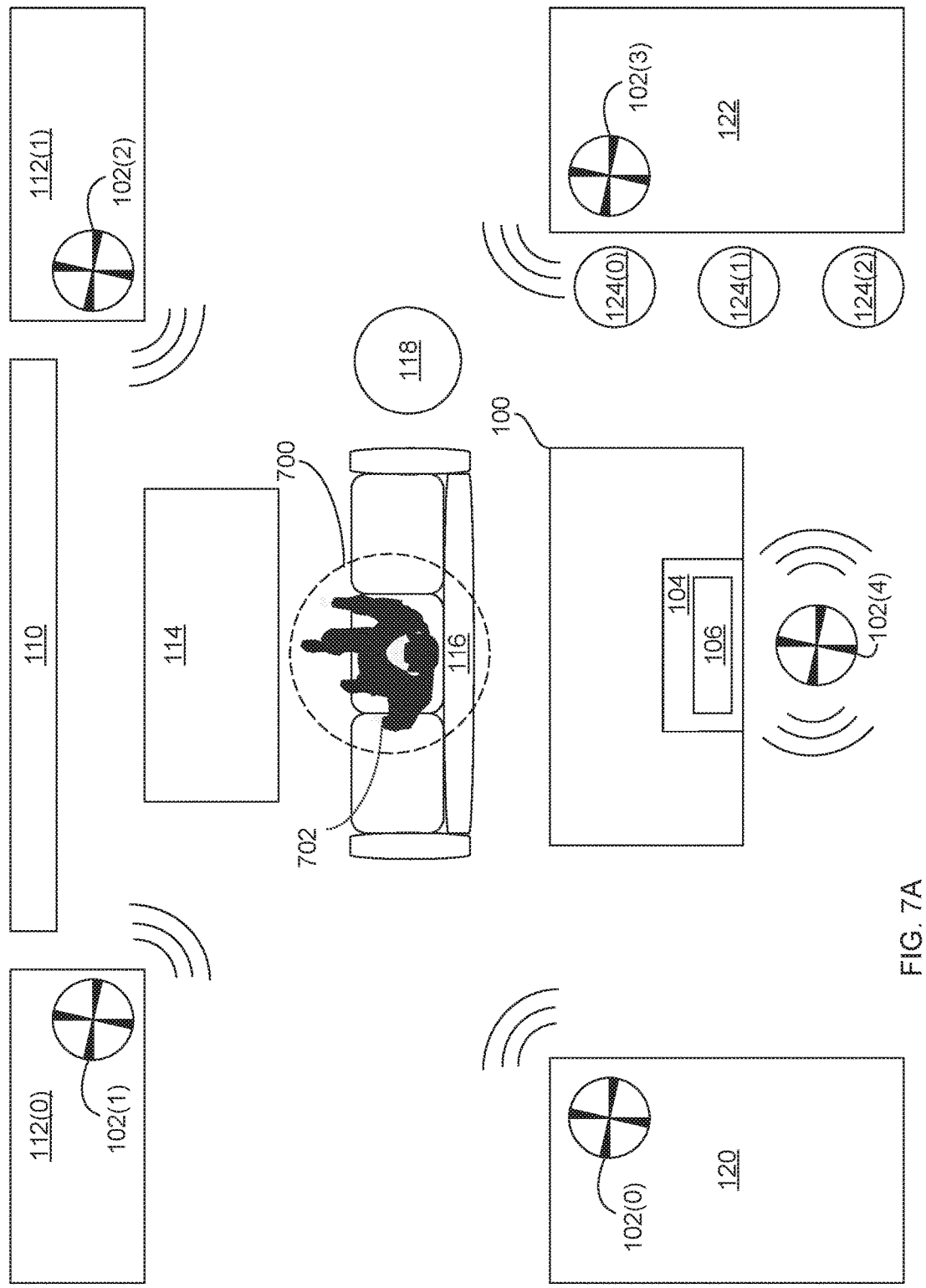
FIGS. 7A-7C illustrate how the drone speaker system of FIGS. 1A-1F repositions a fleet of drone speaker units in response to environmental changes, according to various embodiments.
Figure 7B:
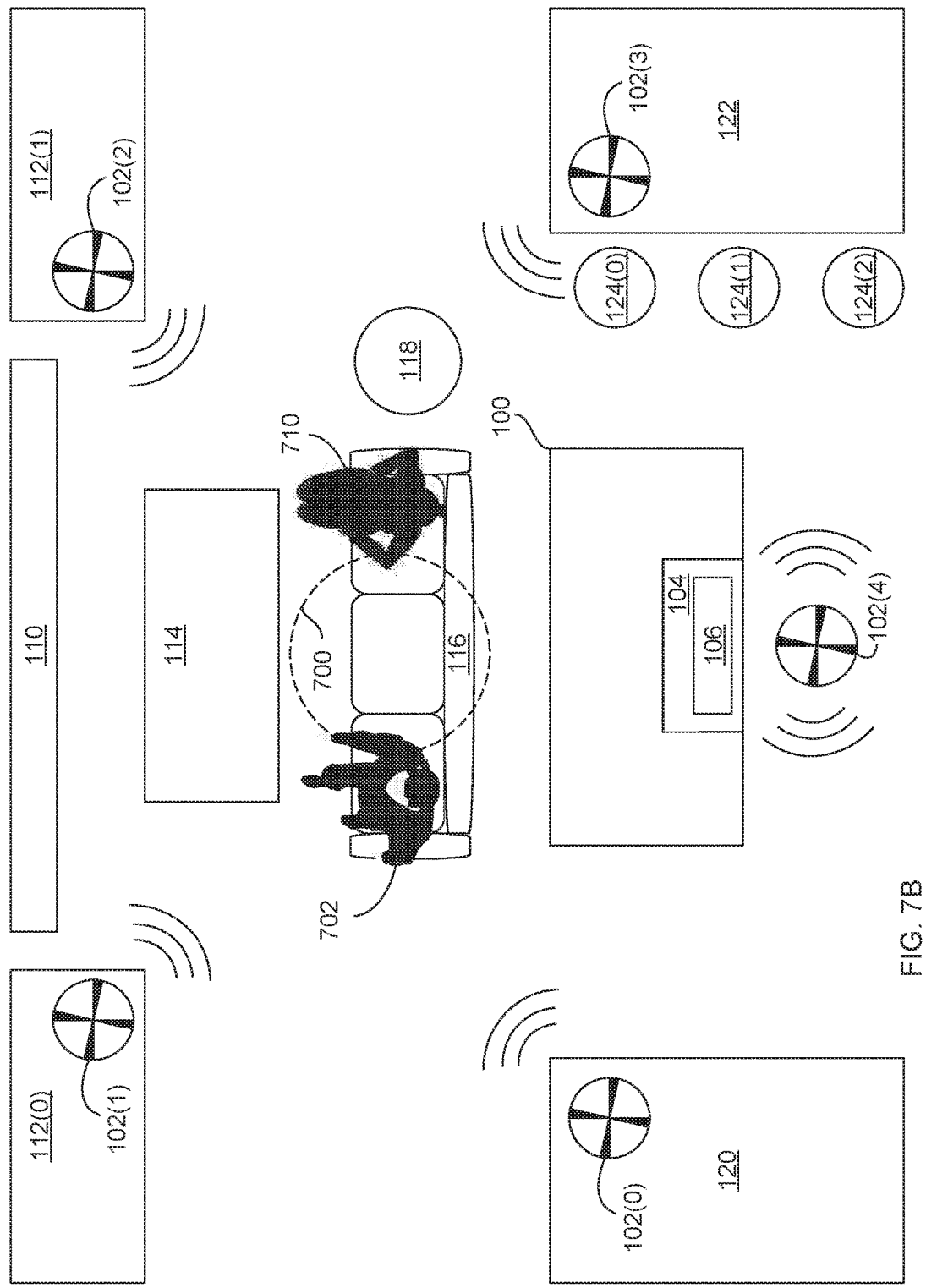
Figure 7C:
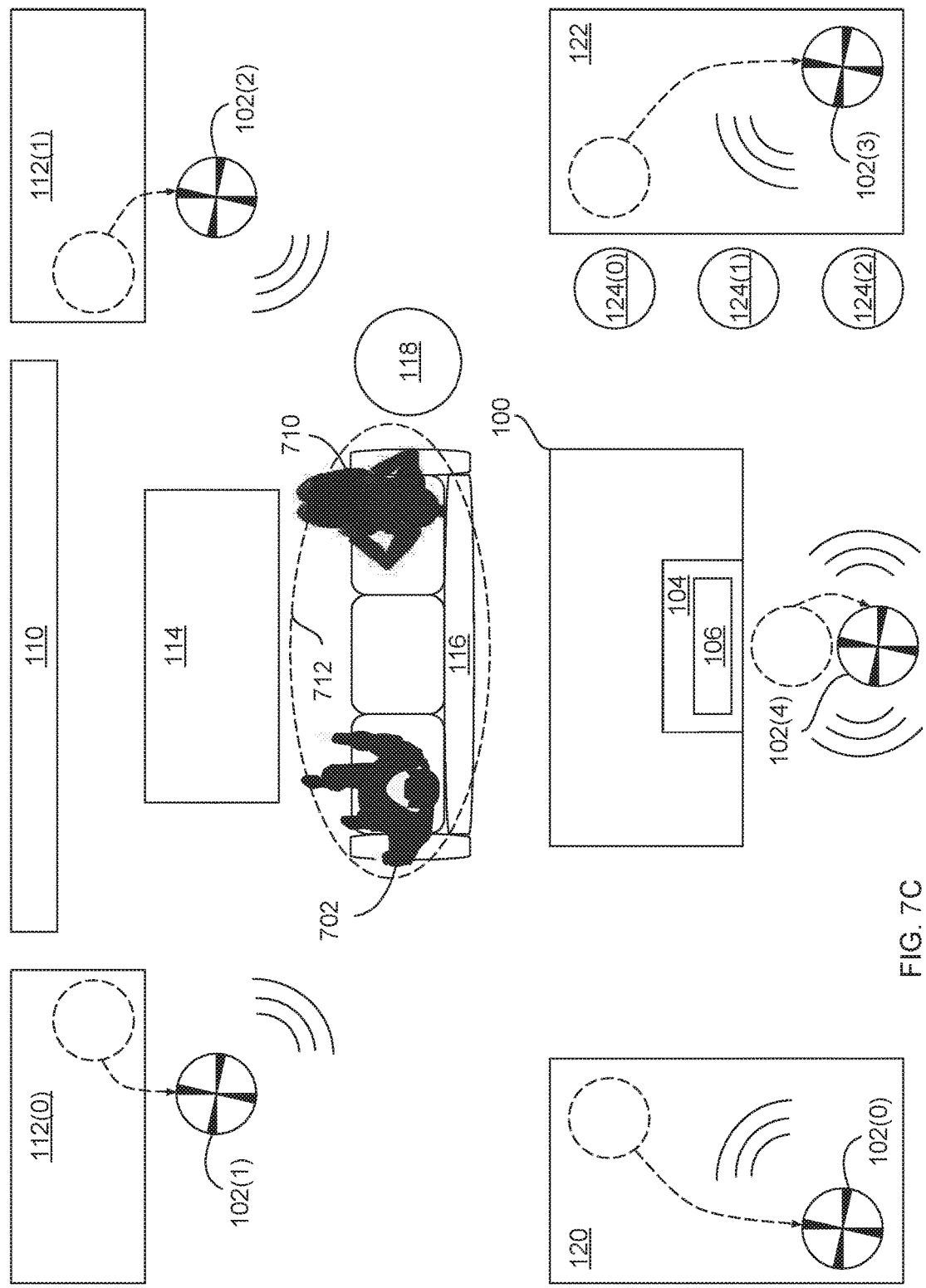

FIGS. 7A-7C illustrate how the drone speaker system of FIGS. 1A-1F repositions a fleet of drone speaker units in response to environmental changes, according to various embodiments. As shown in FIG. 7A, DSUs 102 initially generate a sound field that includes a sound hotspot 700 centered on a listener 702. Sound hotspot 700 may be a location where surround sound generated via DSUs 102 has the greatest quality. Referring now to FIG. 7B, listener 702 changes locations to accommodate listener 710. In the arrangement shown, sound hotspot 700 is not centered in either listener. Accordingly, listeners 702 and 710 may not perceive the best quality sound possible. To remedy this situation, drone speaker system 100 repositions DSUs 102 to modify sound hotspot 700. Referring now to FIG. 7C, drone speaker system 100 causes DSUs 102 to assume slightly different positions in order to generate a sound field having sound hotspot 712 that includes both listeners 702 and 710.

The general approach set forth above can be applied in any context where an environmental change occurs that may affect the quality of a sound field. For example, and without limitation, drone speaker system 100 could place DSUs 102 within a concert hall prior to the arrival of an audience, and then reposition those DSUs 102 to accommodate acoustic variations that may occur after the audience is seated. Drone speaker system 100 may also reposition DSUs 102 dynamically to achieve specific audio effects, as discussed in greater detail below in conjunction with FIGS. 8A-8C.

Figure 8A:
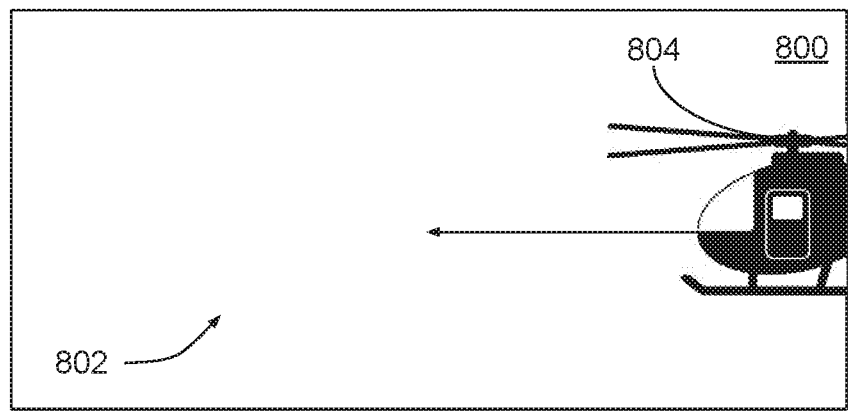
FIGS. 8A-8C illustrate how the drone speaker system of FIGS. 1A-1F deploys a drone speaker unit to simulate an audio effect, according to various embodiments.
Figure 8A:
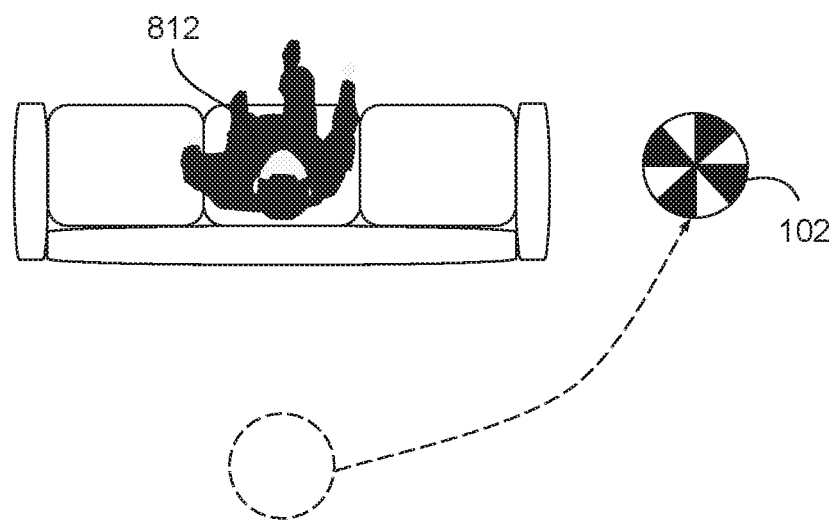
Figure 8B:
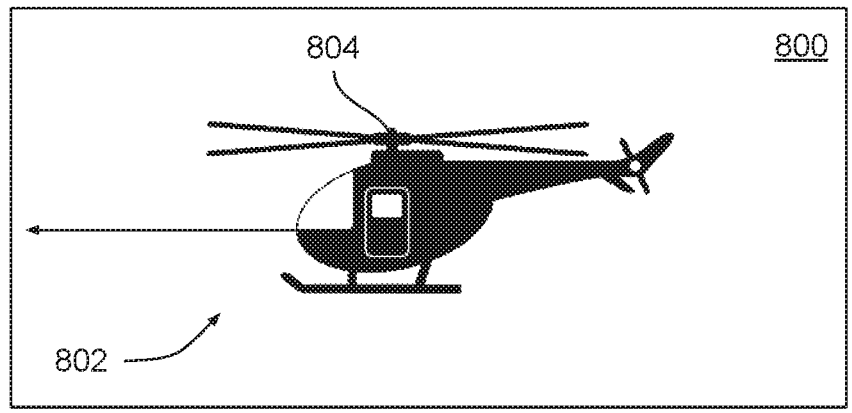
Figure 8B:
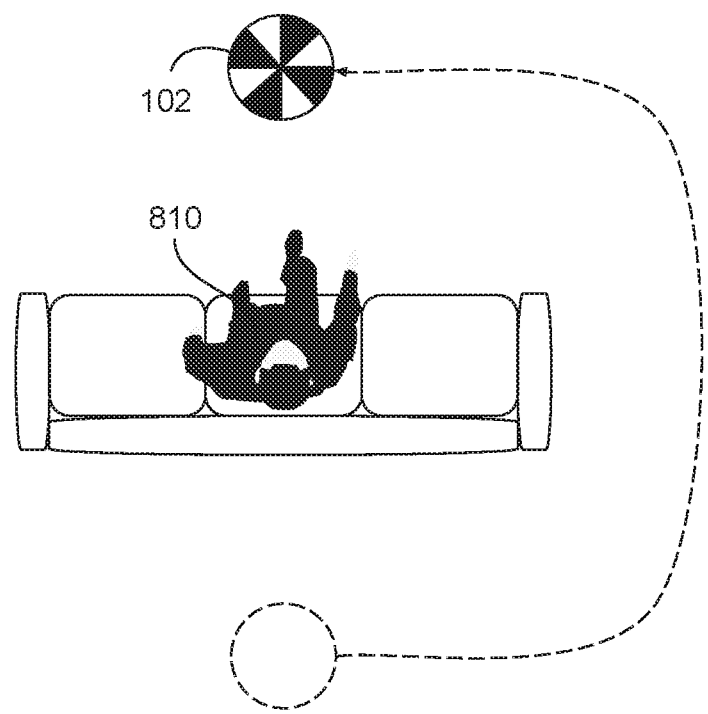
Figure 8C:
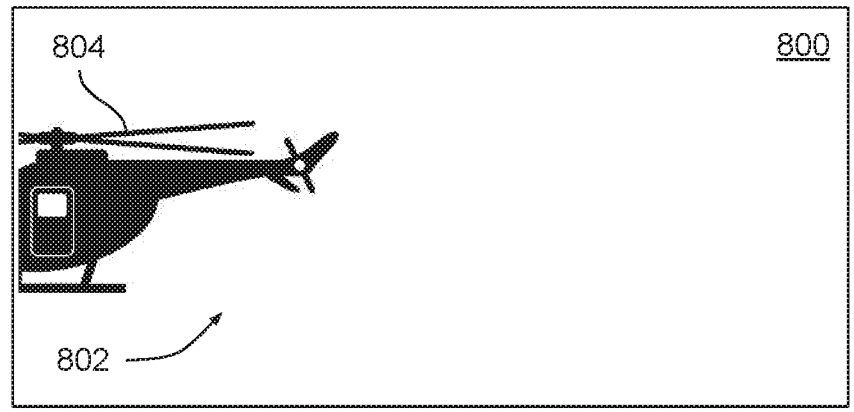
Figure 8C:
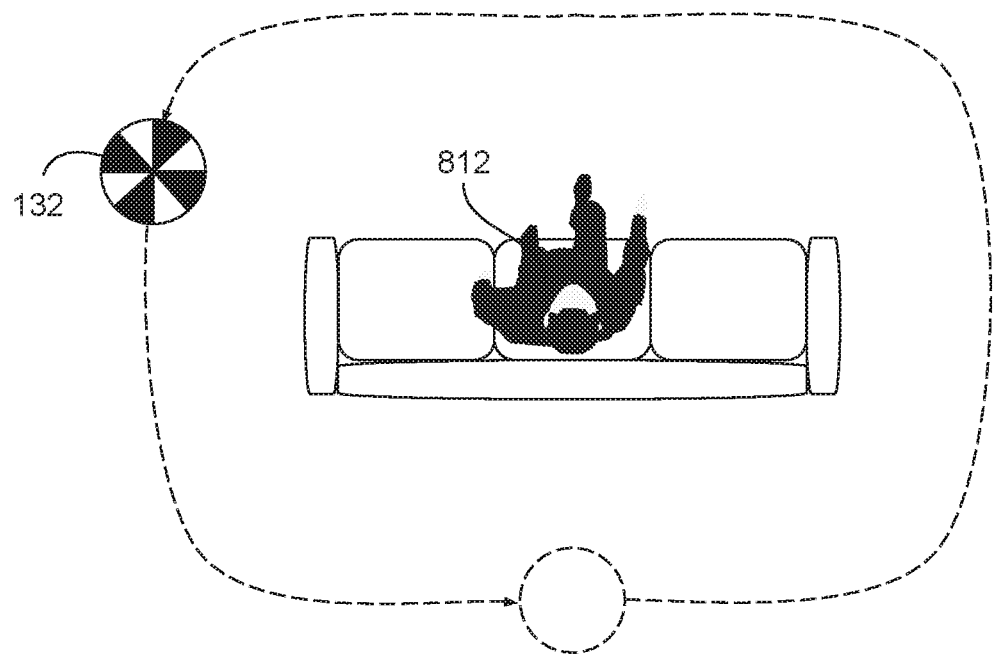

FIGS. 8A-8C illustrate how the drone speaker system of FIGS. 1A-1F deploys a drone speaker unit to simulate an audio effect, according to various embodiments. As shown, a media screen 800 displays media content 802 that may be associated with a soundtrack. The soundtrack may include sound effects intended to accompany that media content 802. In the example shown, a helicopter 804 traverses media screen 800 and may be accompanied by a helicopter sound effect. Control application 106 is configured to analyze media content 802 and/or the associated soundtrack in order to identify sound effects and other sounds that can be augmented via one or more DSUs 102. To augment the helicopter sound effect, control application 106 dispatches a DSU 102 to both output that sound effect and also track the position of helicopter 804.

Referring now to FIG. 8B, as helicopter 804 traverses media screen 800, DSU 102 traverses a path that parallels the traversal of helicopter 804 from the perspective of a listener 810. In doing so, DSU 102 outputs a helicopter sound effect, thereby causing media content 802 to appear more realistic. Referring now to FIG. 8C, as helicopter 804 disappears from media screen 800, DSU 102 completes this traversal and reduces the output of the helicopter sound effect. DSU 102 may then return to an initial position and resume nominal audio output.

In the manner described in conjunction with FIGS. 8A-8C, control application 106 analyzes media content being played and then determines dynamic maneuvers for one or more DSUs 102 to execute, while generating sound, to cause that media content to seem more realistic.

Figure 9B:
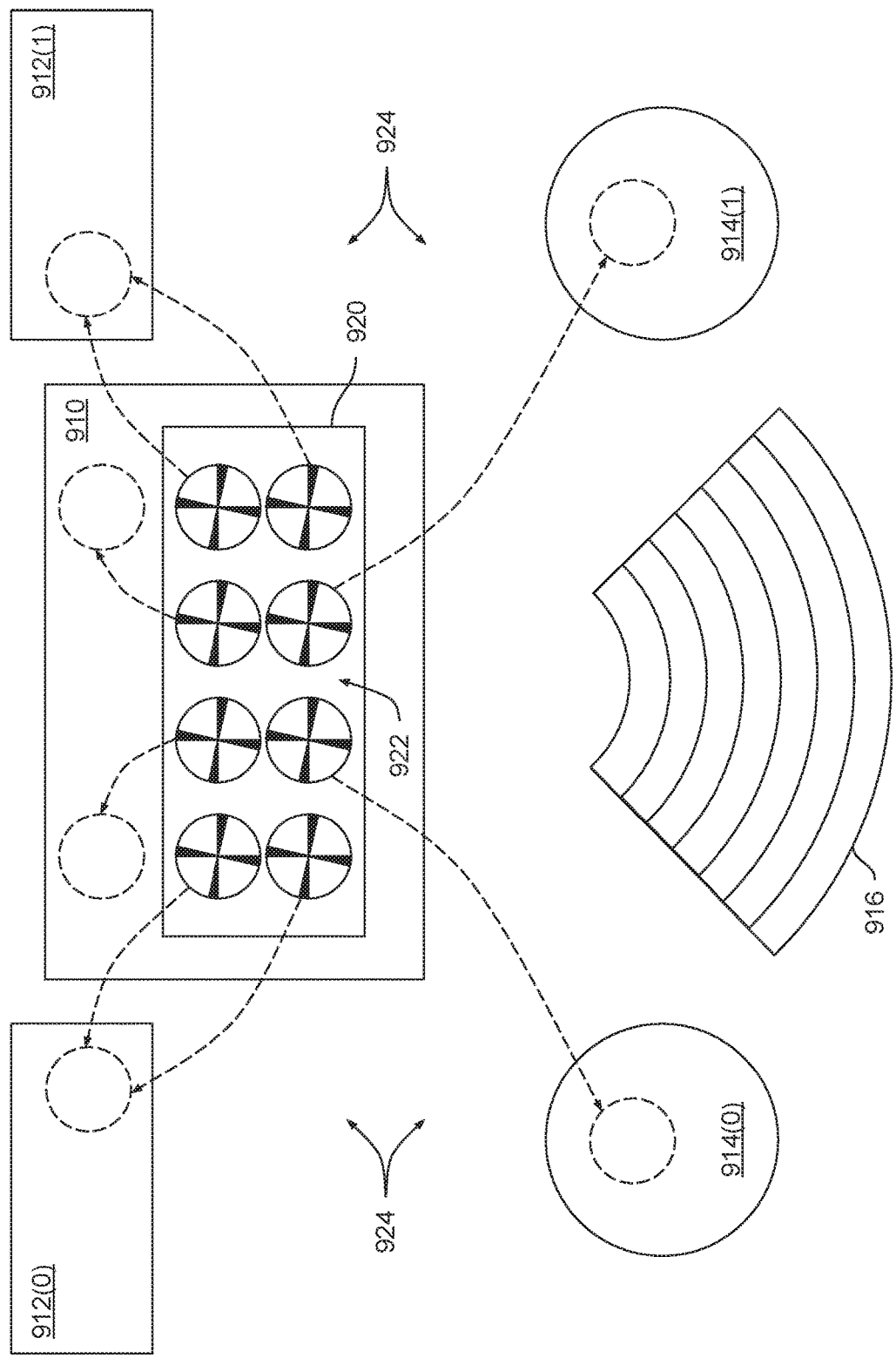

FIGS. 9A-9C illustrate how the drone speaker system of FIGS. 1A-1F deploys a fleet of drone speaker units to configure a concert venue, according to various embodiments. As shown, a venue 900 includes a primary stage 910, secondary stages 912, media towers 914, and seating area 916. Primary stage 910, secondary stages 912, and media towers 914 are locations where audio and/or visual output devices associated with a performance can be stationed. Typically, configuring sound equipment for a large-scale venue such as that shown consumes many working hours, because sound equipment used for large-scale performances is bulky and requires precise, manual positioning. To mitigate this problem, a production-scale drone speaker system 920 can be implemented to deploy a fleet 922 of DSUs capable of autonomously performing that configuration.

Referring now to FIG. 9B, production-scale drone speaker system 920 generates a spatial map of venue, identifies perch zones, generates a placement map, and then generates a flight plan, in similar fashion as previously described (albeit at a larger scale). Production-scale drone speaker system 920 may execute control application 106 (not shown here) to perform these operations. Referring now to FIG. 9C, control application 106 coordinates placement of DSUs (or speaker components associated with DSUs) to implement any technically feasible sound system setup, including stacked audio output components, as is shown. The technique illustrated in FIGS. 9A-9C advantageously reduces human involvement in venue setup and configuration, thereby conserving significant time and cost typically associated with this process.

In general, the techniques described thus far are interchangeable and can be combined in any technically feasible fashion to perform a multitude of different configuration tasks. Via drone speaker system 100, a wide variety of different sound system configurations can be quickly and easily deployed with limited human involvement.

Procedure for Deploying Drone Speaker Units

Figure 10:
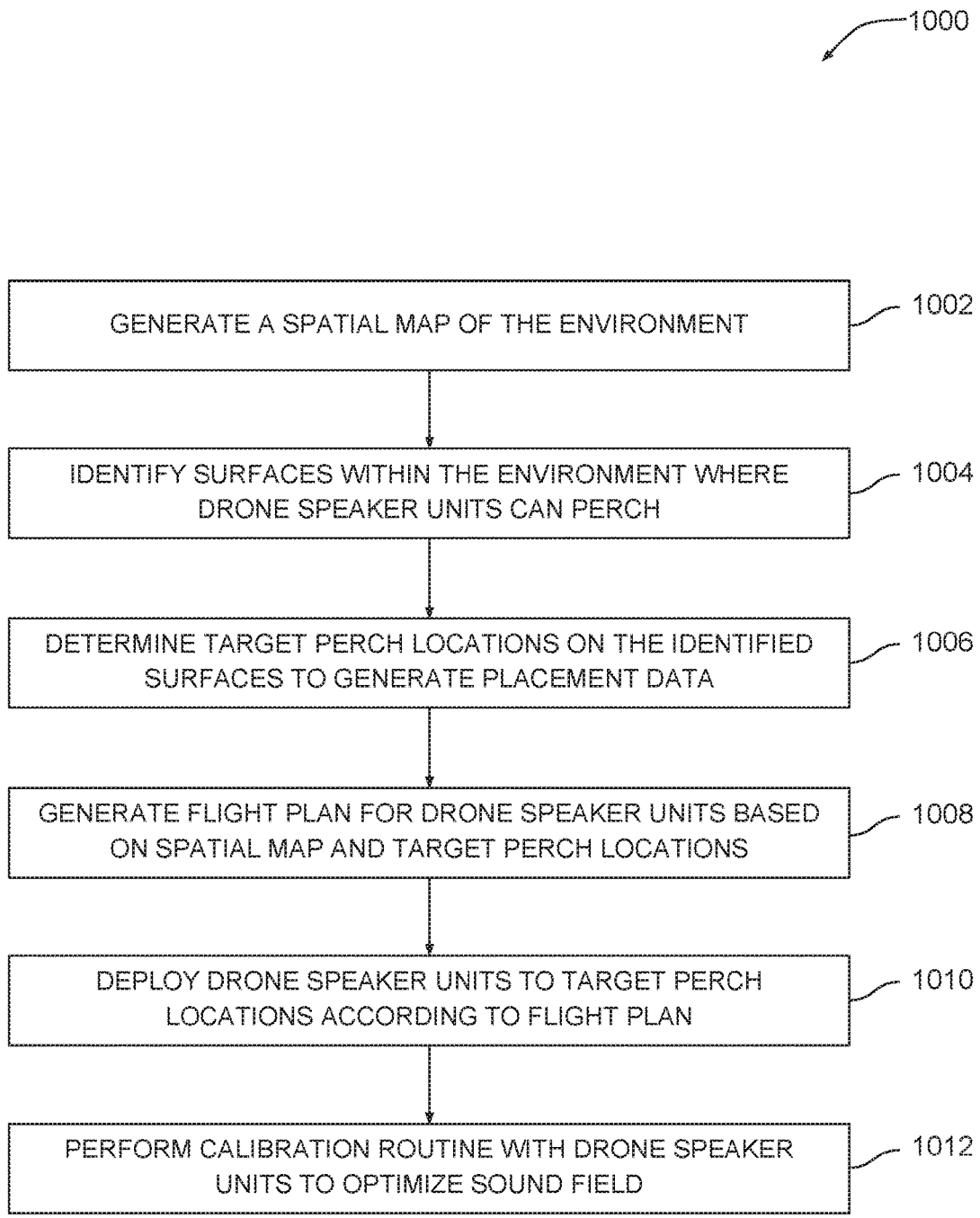
FIG. 10 is a flow diagram of method steps for deploying a fleet of drone speaker units in an environment, according to various embodiments.

FIG. 10 is a flow diagram of method steps for deploying a fleet of drone speaker units into an environment, according to various embodiments. Although the method steps are described in conjunction with the systems of FIGS. 1-9C, persons skilled in the art will understand that any system configured to perform the method steps, in any order, is within the scope of the present invention.

As shown, a method 1000 begins at step 1002, where control application 106 generates a spatial map of the environment where drone speaker system 100 resides. Control application 106 may cause one or more DSUs 102 to perform exploratory sweeps of the environment, among other possibilities. At step 1004, control application 106 analyzes the spatial map to identify surfaces within the environment where drone speaker units can perch. In doing so, control application 106 may identify one or more surfaces that meet specific criteria. At step 1006, control application 106 determines target perch locations on the identified surfaces to generate placement data. Control application 106 may determine the target perch locations based on placement criteria that indicate, among other things, potential configurations according to which a set of speakers and/or DSUs 102 should be distributed.

At step 1008, control application 106 generates a flight plan for drone speaker units based on spatial map and target perch locations. At step 1010, control application 106 deploys DSUs 102 to target perch locations according to the flight plan. At step 1012, control application 102 performs a calibration routine with DSUs 102 to optimize the sound field. In doing so, control application 106 may reposition one or more DSUs 102 and/or modulate the acoustic output of one or more DSUs 102. Control application 106 may implement some or all steps of the method 1000 iteratively in order to deploy DSUs 102 according to different placements. Control application 106 may also dynamically reconfigure DSUs 106 based on environmental conditions, as discussed below in conjunction with FIG. 11.

Figure 11:
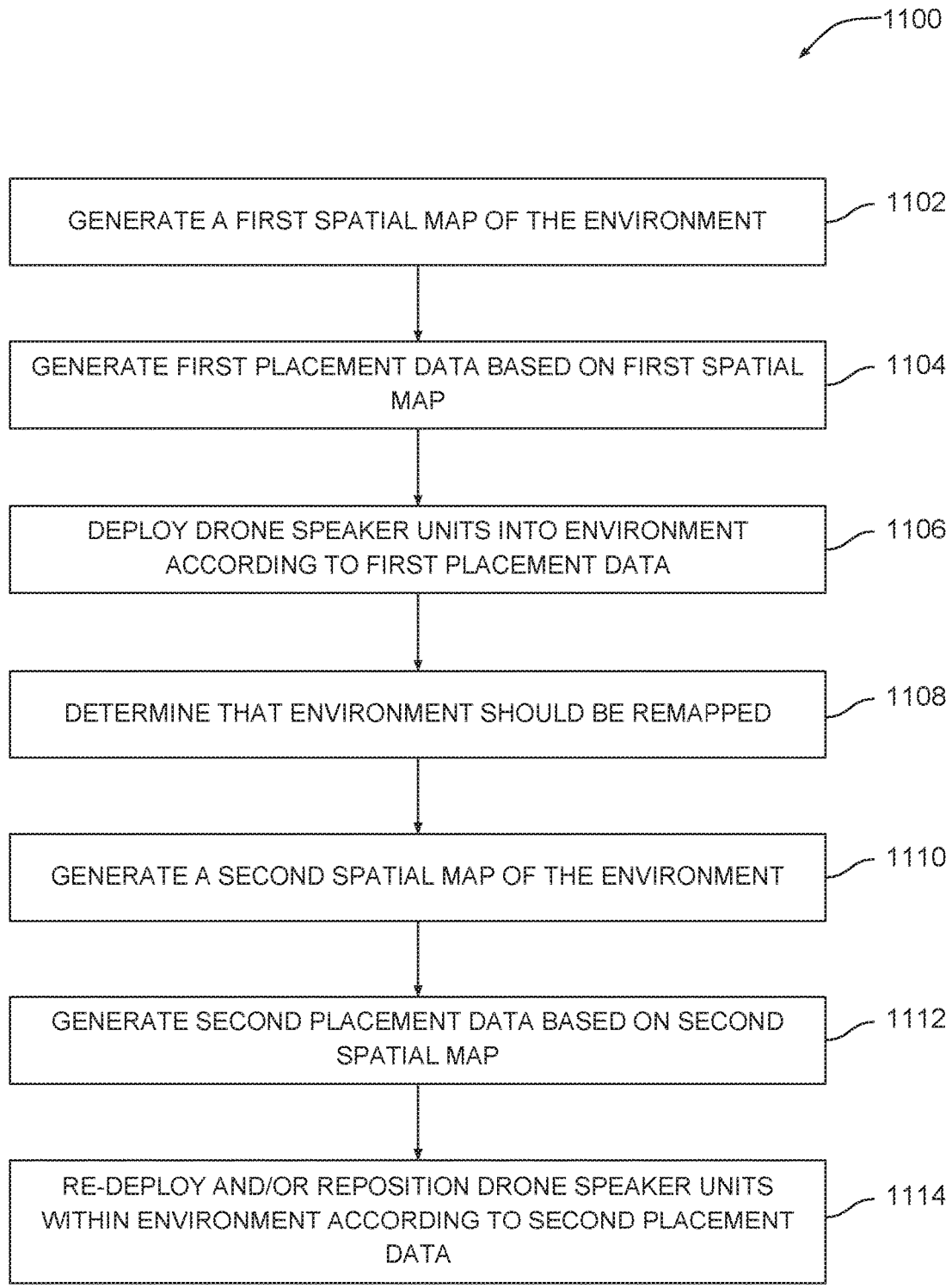
FIG. 11 is a flow diagram of method steps for repositioning a fleet of drone speaker units in response to environmental changes, according to various embodiments.

FIG. 11 is a flow diagram of method steps for repositioning a fleet of drone speaker units in response to environmental changes, according to various embodiments. Although the method steps are described in conjunction with the systems of FIGS. 1-9C, persons skilled in the art will understand that any system configured to perform the method steps, in any order, is within the scope of the present invention.

As shown, a method 1100 begins at step 1102, where control application 106 generates a first spatial map of the environment. At step 1104, control application 106 generates first placement data based on first spatial map. At step 1106, control application 106 deploys DSUs 102 into the environment according to first placement data. Control application 106 may implement the method 1000 in performing steps 1102, 1104, and 1106 discussed herein.

At step 1108, control application 106 determines that the environment should be remapped. For example, and without limitation, control application 106 could determine that DSUs 102 should be redeployed into a different room of a living space. Alternatively, control application 106 could determine the acoustic properties of the environment have changed or are changing dynamically. At step 1110, control application 106 generates a second spatial map of the environment. At step 1112, control application 106 generates second placement data based on second spatial map. At step 1114, control application re-deploys and/or repositions DSUs 102 within the environment according to the second placement data. Control application 106 may perform the method 1100 in real-time and on a continuous basis to reposition DSUs 102 in a manner that adapts to environmental variations and/or user commands.

In sum, a drone speaker system is configured to deploy a fleet of drone speaker units. Each drone speaker unit includes a speaker configured to broadcast acoustic signals and a flight system configured to aerially transport a speaker. The drone speaker system initially generates a spatial map of a location where the drone speaker units are to be deployed. The drone speaker system then identifies suitable perching locations for the drone speaker units. Then, the drone speaker system deploys the fleet of drone speaker units to those perching locations to place one or more speakers. Once positioned in this manner, the speakers can generate a sound field. The drone speaker units may also reconfigure the speakers to achieve different sound fields having varying characteristics.

Advantageously, the drone speaker system automatically determines placement for the speakers and also positions the speakers according to that placement, thereby lifting the burden of doing so from users. Accordingly, users can setup a sound system via the drone speaker system with relative ease. In addition, the placement of speakers associated with the drone speaker system can be adjusted autonomously with limited human involvement, further improving usability and reducing complexity.

1. Some embodiments of the invention include a method for configuring a speaker system, the method comprising: generating a first spatial map of a first listening environment, determining a first set of perch locations within the first listening environment based on the first spatial map, deploying a fleet of drone speaker units to the first set of perch locations to populate the first listening environment with one or more speakers, and causing the one or more speakers to output sound from the first set of perch locations to generate a first sound field within the first listening environment.

2. The method of clause 1, wherein the first spatial map indicates at least one of a geometry associated with the first listening environment, a triangulated mesh associated with the first listening environment, a point cloud associated with the first listening environment, a set of acoustic characteristics associated with the first listening environment, a set of surfaces associated with the first listening environment, a set of textures associated with the first listening environment, and a set of mounting points associated with the first listening environment.

3. The method of any of clauses 1 and 2, wherein determining the first set of perch locations within the first listening environment comprises: identifying, based on one or more perching criteria, a set of surfaces within the first listening environment on which a given drone speaker unit is capable of perching, and determining, based on the set of surfaces and one or more placement criteria, each perch location included in the first set of perch locations, wherein the one or more placement criteria indicate relative positioning between the speakers for generating the first sound field.

4. The method of any of clauses 1, 2, and 3, wherein the one or more speakers, when outputting sound from the first set of perch locations, generate a first acoustic hotspot within the first sound field at a first location in the listening environment.

5. The method of any of clauses 1, 2, 3, and 4, wherein a given drone speaker unit included in the fleet of drone speaker units is integrated with a given speaker included in the one or more speakers.

6. The method of any of clauses 1, 2, 3, 4, and 5, wherein a given drone speaker unit included in the fleet of drone speaker units includes one or more drone components that are configured to be coupled with and decoupled from a given speaker included in the one or more speakers.

7. The method of any of clauses 1, 2, 3, 4, 5, and 6, wherein deploying the fleet of drone speaker units to the first set of perch locations comprises: generating, based on the first spatial map, a first flight plan for navigating within the first listening environment, and transmitting one or more signals to the fleet of drone speakers to cause the fleet of drone speaker units to aerially traverse the first listening environment according to the first flight plan.

8. The method of any of clauses 1, 2, 3, 4, 5, 6, and 7, further comprising calibrating the one or more speakers by performing at least one of: repositioning at least one speaker included in the one or more speakers via an aerial drone, and modifying at least one parameter associated with the at least one speaker to adjust the sound that is output by the at least one speaker.

9. The method of any of clauses 1, 2, 3, 4, 5, 6, 7, and 8, further comprising: determining that the one or more speakers should be reconfigured within the first listening environment to generate a second sound field, determining a second set of perch locations within the first listening environment based on the first spatial map and based on placement criteria indicating at least one configuration for the one or more speakers, redeploying the fleet of drone speaker units to the second set of perch locations, and causing the one or more speakers to output sound from the second set of perch locations to generate the second sound field within the first listening environment.

10. The method of clauses 1, 2, 3, 4, 5, 6, 7, 8, and 9, further comprising: determining that the one or more speakers should be configured within a second listening environment, generating a second spatial map of the second listening environment, determining a second set of perch locations within the second listening environment based on the second spatial map, redeploying the fleet of drone speaker units to the second set of perch locations to populate the second listening environment with the one or more speakers, and causing the one or more speakers to output sound from the second set of perch locations to generate a second sound field within the second listening environment.

11. Some embodiments of the invention include a non-transitory computer-readable medium storing program instructions that, when executed by a processor, cause the processor to configure a speaker system by performing the steps of: identifying a first perch location within a first listening environment based on a first geometrical model of the first listening environment, deploying a first drone speaker unit to the first perch location to place a first speaker at the first perch location, and causing the first speaker to output sound from the first perch location to generate a first sound field within the first listening environment.

12. The non-transitory computer-readable medium of clause 11, further comprising the step of identifying, based on one or more perching criteria, a set of surfaces within the first listening environment on which a given drone speaker unit is capable of perching, wherein the first perch location is identified based on the set of surfaces and one or more placement criteria, the one or more placement criteria indicating relative positioning between the first speaker and a first listener location.

13. The non-transitory computer-readable medium of any of clauses 11 and 12, further comprising the steps of: analyzing media data associated with an acoustic signal output by the first speaker, and repositioning, via an aerial drone associated with the first drone speaker unit, the first speaker to mimic at least a portion of the media data.

14. The non-transitory computer-readable medium of any of clauses 11, 12, and 13, further comprising the step of calibrating the first speaker by performing at least one of: repositioning the first speaker via an aerial drone, and modifying at least one parameter associated with the first speaker to adjust the sound that is output by the first speaker.

15. The non-transitory computer-readable medium of any of clauses 11, 12, 13, and 14, further comprising the steps of: determining that the first speaker should be reconfigured within the first listening environment to generate a second sound field, identifying a second perch location within the first listening environment based on the first geometrical model and based on placement criteria indicating at least one configuration for the first speaker, redeploying the first drone speaker unit to the second perch location, and causing the first speaker to output sound from the second perch location to generate the second sound field within the first listening environment.

16. The non-transitory computer-readable medium of any of clauses 11, 12, 13, 14, and 15, wherein at least one rotor blade associated with the first drone speaker unit is configured to fold and be stored within the first drone speaker unit.

17. The non-transitory computer-readable medium of any of clauses 11, 12, 13, 14, 15, and 16, further comprising the step of transmitting one or more signals to the first drone speaker unit to cause the first drone speaker unit to continuously reposition the first speaker in response to a changing listener location.

18. The non-transitory computer-readable medium of any of clauses 11, 12, 13, 14, 15, 16, and 17, wherein the first listening environment comprises a concert venue, and wherein the first drone speaker unit places the first speaker on top of another speaker that resides in the concert venue and is placed via aerial drone.

19. Some embodiments of the invention include a system for configuring speakers, comprising: a fleet of drone speaker units, wherein each drone speaker unit included in the fleet of drone speaker units comprises: at least one speaker that generates sound, and one or more drone components that aerially transport the at least one speaker, and a computing device, comprising: a memory storing a control application, and a processor that, when executing the control application, is configured to perform the steps of: deploying a fleet of drone speaker units to a first set of perch locations to populate a first listening environment with one or more speakers, and causing the one or more speakers to output sound from the first set of perch locations to generate a first sound field within the first listening environment.

20. The system of clause 19, wherein the fleet of drone speakers comprises one or more rear channel speakers, and the processor is configured to deploy the one or more rear channel speakers from a dock coupled to at least one of a center channel speaker and a front channel speaker, wherein, when executing the control application, the processor is further configured to perform the step of recalling the one or more rear channel speakers to the dock.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for configuring a speaker system, the method comprising:
   generating a first spatial map of a first listening environment;
   determining a first set of perch locations within the first listening environment based on the first spatial map;
   deploying a fleet of drone speaker units to the first set of perch locations to populate the first listening environment with one or more speakers; and
   causing the one or more speakers to output sound from the first set of perch locations to generate a first sound field within the first listening environment.

2. The method of claim 1, wherein the first spatial map indicates at least one of a geometry associated with the first listening environment, a triangulated mesh associated with the first listening environment, a point cloud associated with the first listening environment, a set of acoustic characteristics associated with the first listening environment, a set of surfaces associated with the first listening environment, a set of textures associated with the first listening environment, and a set of mounting points associated with the first listening environment.

3. The method of claim 1, wherein determining the first set of perch locations within the first listening environment comprises:
   identifying, based on one or more perching criteria, a set of surfaces within the first listening environment on which a given drone speaker unit is capable of perching; and
   determining, based on the set of surfaces and one or more placement criteria, each perch location included in the first set of perch locations, wherein the one or more placement criteria indicate relative positioning between the speakers for generating the first sound field.

4. The method of claim 1, wherein the one or more speakers, when outputting sound from the first set of perch locations, generate a first acoustic hotspot within the first sound field at a first location in the listening environment.

5. The method of claim 1, wherein a given drone speaker unit included in the fleet of drone speaker units is integrated with a given speaker included in the one or more speakers.

6. The method of claim 1, wherein a given drone speaker unit included in the fleet of drone speaker units includes one or more drone components that are configured to be coupled with and decoupled from a given speaker included in the one or more speakers.

7. The method of claim 1, wherein deploying the fleet of drone speaker units to the first set of perch locations comprises:
   generating, based on the first spatial map, a first flight plan for navigating within the first listening environment; and transmitting one or more signals to the fleet of drone speakers to cause the fleet of drone speaker units to aerially traverse the first listening environment according to the first flight plan.

8. The method of claim 1, further comprising calibrating the one or more speakers by performing at least one of:
repositioning at least one speaker included in the one or more speakers via an aerial drone; and
modifying at least one parameter associated with the at least one speaker to adjust the sound that is output by the at least one speaker.

9. The method of claim 1, further comprising:
determining that the one or more speakers should be reconfigured within the first listening environment to generate a second sound field;
determining a second set of perch locations within the first listening environment based on the first spatial map and based on placement criteria indicating at least one configuration for the one or more speakers;
redeploying the fleet of drone speaker units to the second set of perch locations; and
causing the one or more speakers to output sound from the second set of perch locations to generate the second sound field within the first listening environment.

10. The method of claim 1, further comprising:
determining that the one or more speakers should be configured within a second listening environment;
generating a second spatial map of the second listening environment;
determining a second set of perch locations within the second listening environment based on the second spatial map;
redeploying the fleet of drone speaker units to the second set of perch locations to populate the second listening environment with the one or more speakers; and
causing the one or more speakers to output sound from the second set of perch locations to generate a second sound field within the second listening environment.

11. A non-transitory computer-readable medium storing program instructions that, when executed by a processor, causes the processor to configure a speaker system by performing the steps of:
identifying a first perch location within a first listening environment based on a first geometrical model of the first listening environment;
deploying a first drone speaker unit to the first perch location to place a first speaker at the first perch location; and
causing the first speaker to output sound from the first perch location to generate a first sound field within the first listening environment.

12. The non-transitory computer-readable medium of claim 11, further comprising the step of identifying, based on one or more perching criteria, a set of surfaces within the first listening environment on which a given drone speaker unit is capable of perching, wherein the first perch location is identified based on the set of surfaces and one or more placement criteria, the one or more placement criteria indicating relative positioning between the first speaker and a first listener location.

13. The non-transitory computer-readable medium of claim 11, further comprising the steps of:
analyzing media data associated with an acoustic signal output by the first speaker; and
repositioning, via an aerial drone associated with the first drone speaker unit, the first speaker to mimic at least a portion of the media data.

14. The non-transitory computer-readable medium of claim 11, further comprising the step of calibrating the first speaker by performing at least one of:
repositioning the first speaker via an aerial drone; and
modifying at least one parameter associated with the first speaker to adjust the sound that is output by the first speaker.

15. The non-transitory computer-readable medium of claim 11, further comprising the steps of:
determining that the first speaker should be reconfigured within the first listening environment to generate a second sound field;
identifying a second perch location within the first listening environment based on the first geometrical model and based on placement criteria indicating at least one configuration for the first speaker;
redeploying the first drone speaker unit to the second perch location; and
causing the first speaker to output sound from the second perch location to generate the second sound field within the first listening environment.

16. The non-transitory computer-readable medium of claim 11, wherein at least one rotor blade associated with the first drone speaker unit is configured to fold and be stored within the first drone speaker unit.

17. The non-transitory computer-readable medium of claim 11, further comprising the step of transmitting one or more signals to the first drone speaker unit to cause the first drone speaker unit to continuously reposition the first speaker in response to a changing listener location.

18. The non-transitory computer-readable medium of claim 11, wherein the first listening environment comprises a concert venue, and wherein the first drone speaker unit places the first speaker on top of another speaker that resides in the concert venue and is placed via aerial drone.

19. A system for configuring speakers, comprising:
a fleet of drone speaker units, wherein each drone speaker unit included in the fleet of drone speaker units comprises:
at least one speaker that generates sound, and
one or more drone components that aerially transport the at least one speaker; and
a computing device, comprising:
a memory storing a control application, and
a processor that, when executing the control application, is configured to perform the steps of:
deploying a fleet of drone speaker units to a first set of perch locations to populate a first listening environment with one or more speakers, and
causing the one or more speakers to output sound from the first set of perch locations to generate a first sound field within the first listening environment.

20. The system of claim 19, wherein the fleet of drone speakers comprises one or more rear channel speakers, and the processor is configured to deploy the one or more rear channel speakers from a dock coupled to at least one of a center channel speaker and a front channel speaker, wherein, when executing the control application, the processor is further configured to perform the step of recalling the one or more rear channel speakers to the dock.

* * * * *